(12) United States Patent
Patel et al.

(10) Patent No.: US 7,788,606 B2
(45) Date of Patent: Aug. 31, 2010

(54) COMPUTER-IMPLEMENTED SYSTEM AND METHOD FOR DEFINING GRAPHICS PRIMITIVES

(75) Inventors: Himesh G. Patel, Apex, NC (US); Stuart A. Nisbet, Cary, NC (US); Vikram Dere, Durham, NC (US); Keith V. Collins, Raleigh, NC (US); Sarat M. Kocherlakota, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 1093 days.

(21) Appl. No.: 10/867,181

(22) Filed: Jun. 14, 2004

(65) Prior Publication Data

US 2005/0275622 A1 Dec. 15, 2005

(51) Int. Cl.
G06F 3/033 (2006.01)
G06F 17/00 (2006.01)
G06F 15/177 (2006.01)
G06F 3/14 (2006.01)
G06F 3/037 (2006.01)
G09G 3/28 (2006.01)
G09G 3/22 (2006.01)

(52) U.S. Cl. .................. 715/863; 715/207; 715/737; 715/864; 345/179; 345/180; 345/181; 345/182; 345/183

(58) Field of Classification Search ............... 715/863, 715/864, 207, 737; 345/179, 230, 180, 181–183
See application file for complete search history.

(56) References Cited

U.S. PATENT DOCUMENTS

| | | | | |
|---|---|---|---|---|
| 5,124,693 A | * | 6/1992 | Himelstein et al. | 345/427 |
| 5,347,295 A | | 9/1994 | Agulnick et al. | |
| 5,454,043 A | * | 9/1995 | Freeman | 382/168 |
| 5,511,148 A | * | 4/1996 | Wellner | 358/1.6 |
| 5,544,358 A | * | 8/1996 | Capps et al. | 715/201 |
| 5,583,543 A | * | 12/1996 | Takahashi et al. | 345/173 |
| 5,634,133 A | * | 5/1997 | Kelley | 715/209 |
| 5,778,404 A | * | 7/1998 | Capps et al. | 715/234 |
| 5,784,504 A | | 7/1998 | Anderson et al. | |
| 5,809,267 A | * | 9/1998 | Moran et al. | 715/863 |
| 5,828,376 A | * | 10/1998 | Solimene et al. | 715/821 |
| 5,844,572 A | * | 12/1998 | Schott | 345/440 |
| 5,880,743 A | * | 3/1999 | Moran et al. | 345/473 |
| 5,907,328 A | * | 5/1999 | Brush, II et al. | 715/863 |
| 6,002,808 A | * | 12/1999 | Freeman | 382/288 |

(Continued)

OTHER PUBLICATIONS

"Corel Corporation Lauches Corel Grafigo for Microsotf Window XP Tabler OC Edition at Widley Anticipated New York Event;" Published on Nov. 7, 2002; Publisher Business wire. http://www.allbusiness.com/electronics/computer-equipment-personal-computers/6004586-1.html.*

(Continued)

Primary Examiner—Dennis-Doon Chow
Assistant Examiner—Linh K Pham
(74) Attorney, Agent, or Firm—Jones Day

(57) ABSTRACT

Systems and methods for generating graphic primitives. Data is received that is indicative of a gesture provided by a user. It is determined whether the received gesture data is indicative of a graphic primitive. A graphic primitive is generated for use on a user display based upon said determining step.

31 Claims, 28 Drawing Sheets

U.S. PATENT DOCUMENTS

| | | | |
|---|---|---|---|
| 6,057,845 A | | 5/2000 | Dupouy |
| 6,072,494 A | * | 6/2000 | Nguyen ..................... 715/863 |
| 6,351,222 B1 | * | 2/2002 | Swan et al. ............ 340/825.72 |
| 6,356,285 B1 | * | 3/2002 | Burkwald et al. ........... 715/853 |
| 6,359,627 B1 | * | 3/2002 | Someya ..................... 345/619 |
| 6,362,825 B1 | * | 3/2002 | Johnson ..................... 345/522 |
| 6,384,849 B1 | * | 5/2002 | Morcos et al. ............. 715/810 |
| 6,525,749 B1 | * | 2/2003 | Moran et al. ................ 715/863 |
| 6,595,430 B1 | * | 7/2003 | Shah ...................... 236/46 R |
| 6,597,347 B1 | * | 7/2003 | Yasutake ................... 345/173 |
| 6,727,919 B1 | * | 4/2004 | Reder et al. ................. 715/810 |
| 6,801,190 B1 | * | 10/2004 | Robinson et al. ........... 345/173 |
| 6,802,055 B2 | * | 10/2004 | Jade et al. .................. 717/130 |
| 6,915,492 B2 | * | 7/2005 | Kurtenbach et al. ......... 715/810 |
| 6,938,220 B1 | * | 8/2005 | Shigematsu et al. ......... 715/863 |
| 7,106,336 B1 | * | 9/2006 | Hutchins .................... 345/530 |
| 7,137,076 B2 | * | 11/2006 | Iwema et al. ............... 715/863 |
| 7,212,208 B2 | * | 5/2007 | Khozai ....................... 345/440 |
| 7,251,367 B2 | * | 7/2007 | Zhai ........................... 382/229 |
| 7,392,249 B1 | * | 6/2008 | Harris et al. .................... 707/5 |
| 2002/0007380 A1 | * | 1/2002 | Bauchot et al. ............. 707/530 |
| 2002/0080161 A1 | * | 6/2002 | St. Maurice et al. ........ 345/719 |
| 2002/0140714 A1 | * | 10/2002 | Hoffman .................... 345/700 |
| 2004/0021701 A1 | * | 2/2004 | Iwema et al. ............... 345/863 |
| 2004/0161132 A1 | * | 8/2004 | Cohen et al. ................ 382/103 |
| 2005/0005249 A1 | * | 1/2005 | Hill et al. .................... 715/963 |
| 2005/0025363 A1 | * | 2/2005 | Lui et al. .................... 382/187 |
| 2005/0068320 A1 | * | 3/2005 | Jaeger ........................ 345/440 |
| 2005/0114788 A1 | * | 5/2005 | Fabritius ..................... 715/767 |
| 2005/0275622 A1 | * | 12/2005 | Patel et al. .................. 345/156 |
| 2006/0181534 A1 | * | 8/2006 | Meinds et al. .............. 345/473 |
| 2006/0200778 A1 | * | 9/2006 | Gritzman et al. ............ 715/781 |

OTHER PUBLICATIONS

Title: "Corel Grafigo 2"; Date added Mar. 22, 2004; publisher Corel; Verson 2 http://www.tabletpcpost.com/modules.php?op=modload&name=Downloads&file=index&req=viewdownloaddetails&lid=73&ttitle=Corel?_Grafigo?_2.*

Corel Grafigo 2 user Guide; Copyright 2003 Corel Corel Corporation http://sumanual.com/instrucciones-guia-manual/COREL/GRAFIGO%202-_E.*

Corel Grafigo 2 user guide; corel Corporation; Copyright 2003; http://www.corel.com/futuretense_cs/ccurl/Grafigo_2_User_Guide_EN.pdf.*

Corel Grafigo 2 Reviewer's Guide; Corel Corporation; copyright 2003; http://www.corel.com/futuretense_cs/ccurl/Grafigo2_ReviewersGuide_ENG.pdf.*

Levent et al.; SimUSketch: A Sketchbased interface for Simulink; Copyright 2004; 4 pages; http://delivery.acm.org/10.1145/990000/989923/p354-kara.pdf?key1=989923&key2=4702238621&coll=ACM&dl=ACM&CFID=81501289&CFTOKEN=48068825.*

Beryl et al.; Beautifying Sketching-based Design Tool Content: Issues and Experiences; Copyright © 2005; vol. 40; 8 pages; http://delivery.acm.org/10.1145/1090000/1082248/p31-plimmer.pdf?key1=1082248&key2=9542238621&coll=ACM&dl=ACM&CFID=81501289&CFTOKEN=48068825.*

Henzen et al.; Sketching with a Low-latency Electronic Ink Drawing Tablet; Copyright 2005 ; 10 pages; http://delivery.acm.org/10.1145/1110000/1101399/p51-henzen.pdf?key1=1101399&key2=5461238621&coll=ACM&dl=ACM&CFID=81501289&CFTOKEN=48068825.*

Takeo et al.; A Sketching Interface for 3D Freeform Design; Copyright ACM 1999; 8 pages; http://delivery.acm.org/10.1145/320000/311602/p409-igarashi.pdf?key1=311602&key2=1264238621&coll=GUIDE&dl=GUIDE&CFID=81512171&CFTOKEN=54267791.*

* cited by examiner

COMPUTER-IMPLEMENTED SYSTEM AND METHOD FOR DEFINING GRAPHICS PRIMITIVES

TECHNICAL FIELD

The present invention relates generally to computer-implemented graph generation and more particularly to using gesture-based inputs to define graphics primitives.

BACKGROUND

Computer systems which handle data generated by operating a stylus are becoming commonplace. A stylus-based user interface generally comprises a pen (called a stylus) and a digitizing tablet. The use of stylus-based user interfaces is being driven by the general trend toward more natural user interfaces utilizing hand writing and freehand drawing.

However, digitizing tablets are difficult to use when attempting to generate graphs. The stylus, while promoting a more natural user interface, has limited usage when a user is trying to generate a business quality graph. Other computer-human interfaces similarly suffer when dealing with graph generation and editing operations, and accordingly improvements are needed.

SUMMARY

In accordance with the teachings provided herein, systems and methods are provided for generating graphic primitives. As an example of a system and method, data is received that is indicative of a gesture provided by a user. It is determined whether the received gesture data is indicative of a graphic primitive. A graphic primitive is generated for use on a user display based upon said determining step.

DETAILED DESCRIPTION

Figure 1:
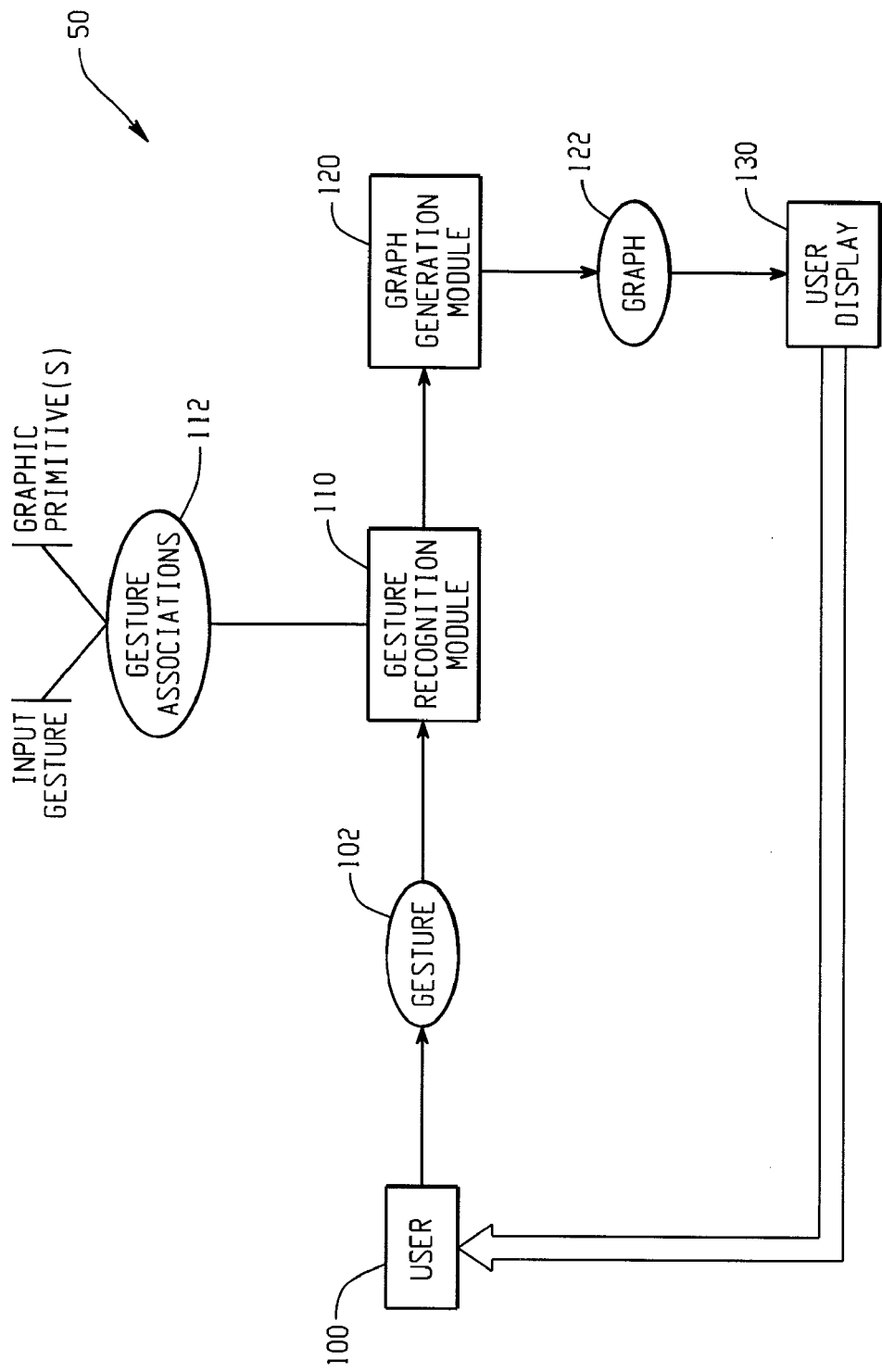
FIG. 1 is a block diagram depicting a system for generating graphics based upon gestures provided by a user.

FIG. 1 depicts a computer-implemented system 50 to generate business graphics (e.g., bar charts, pie charts, etc.) using gestures. A user 100 provides input shapes or gestures 102 to a gesture recognition module 110. The gesture recognition module 110 recognizes the input gestures 102 from the user 100 that imply specific commands or primitives for drawing graphics 122, and to display the desired graphics 122 on the user's display 130.

The gesture recognition module 110 may access a data store 112 that contains associations between what graphic primitive(s) correspond to which input gesture(s). The gesture recognition module 110 identifies which (if any) graphic primitive corresponds to the user's input gesture 102, and provides the identified graphic primitive type to a graph generation module 120. The graph generation module 120 generates for display upon the user's display 130 a graph (e.g., graphic primitive) 122 that corresponds to the identified graphic primitive.

The system 50 can be configured such that users do not need to supply any other additional information apart from the input gesture to imply certain operations or commands pertaining to drawing graphs. The graphs can be displayed on the user's interface such that they appear as business-level (or engineering-level, etc.) quality type graphs.

Figure 2:
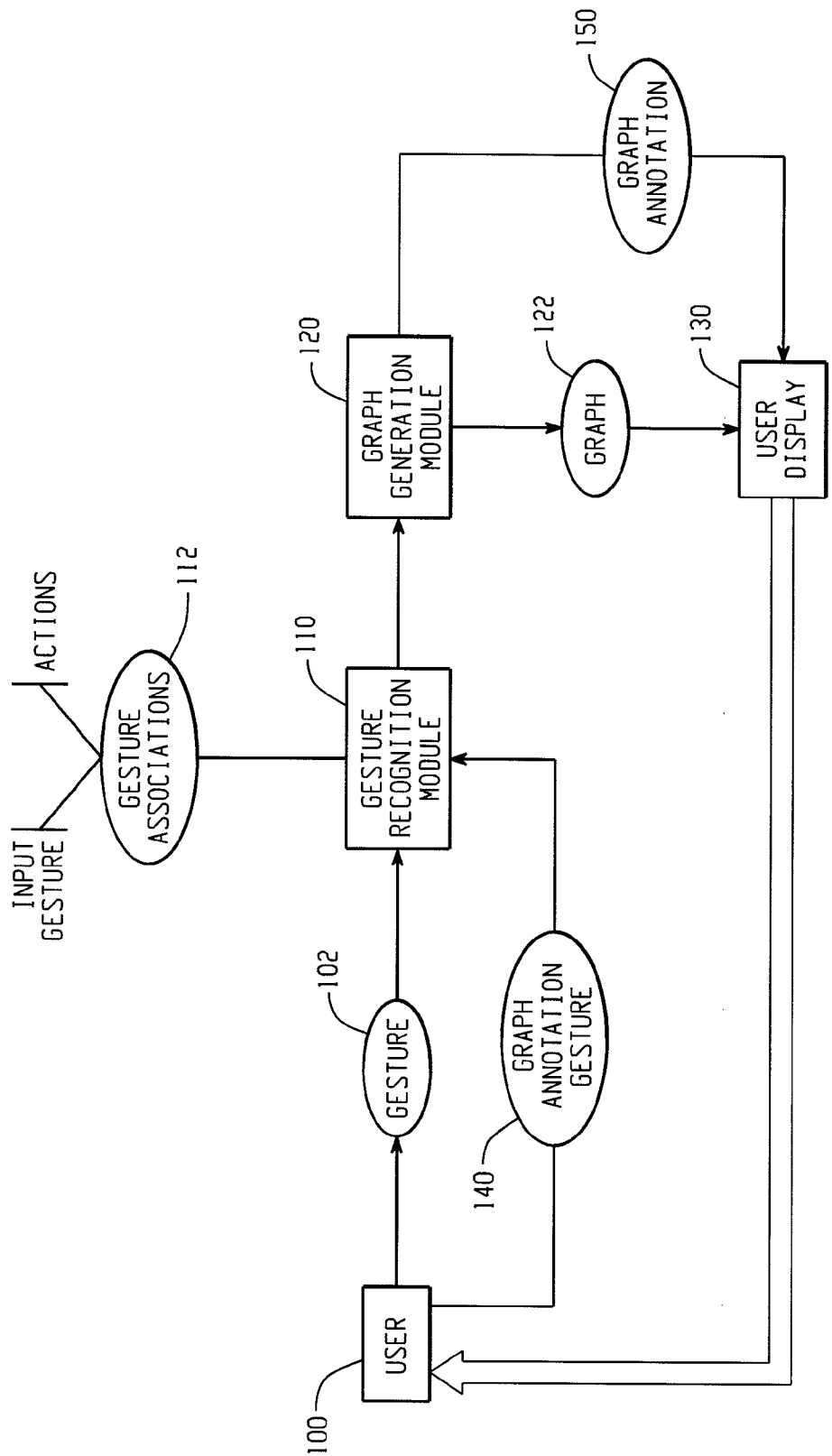
FIG. 2 is a block diagram wherein a user performs a graph annotation gesture which is provided to a gesture recognition module.

As shown in FIG. 2, a user can perform a graph annotation gesture 140 which is provided to a gesture recognition module 110. The gesture recognition module 110 recognizes that the input gesture 140 from the user 100 corresponds to an annotation action that is to be performed upon a displayed graph 122. The recognized annotation action is provided to a graph generation module 120 so that the graph generation module 120 can process the recognized request and update the graph 122 on the user's display 130 with the graph annotation 150.

Figure 3:
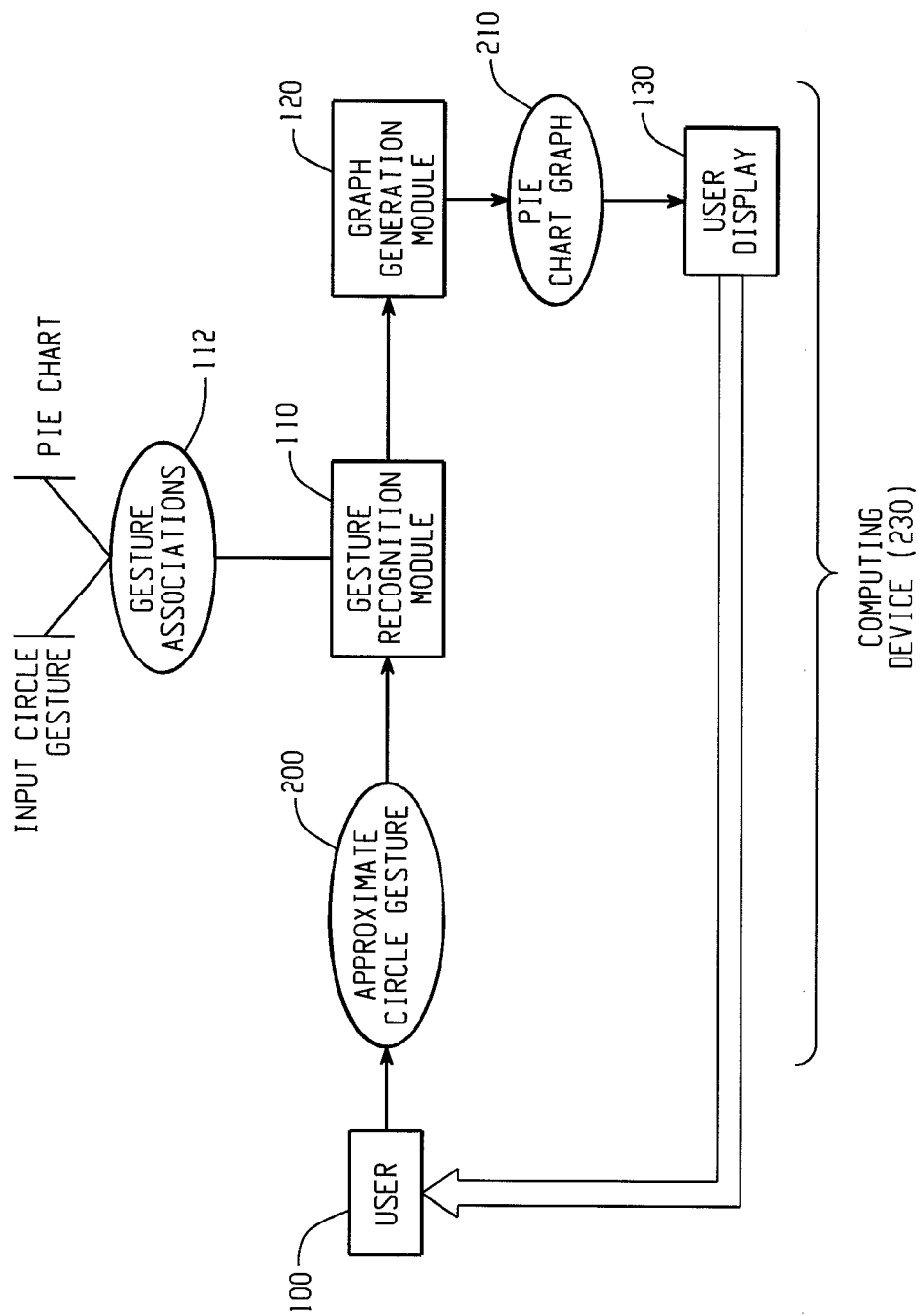
FIG. 3 is a block diagram illustrating the matching of specific input gestures to graph drawing primitives.

FIG. 3 provides an example of the ability to match specific input gestures to graph drawing primitives. With reference to FIG. 3, a user performs a circular gesture 200 to denote a pie chart. The gesture is provided to the gesture recognition module 110. Associations 112 between input gestures and graphic primitives are used by the gesture recognition module 110 to determine that the input approximate circular gesture 200 corresponds to a pie chart. Based upon this recognition, a graph generation module 120 understands that a pie chart graph 210 is to be generated and displayed on a user's display 130.

It should be understood that many different types of gesture input can be handled by gesture recognition module 110. As illustrations, a bar-like shape input gesture can be used to denote a bar chart, or a horizontal stroke to denote a delete operation on the chart.

Because a system relies on shapes drawn by human users, the drawn shapes are not expected to be geometrically accurate. Instead, they typically only need to approximately resemble specific geometric shapes. Accordingly, a system allows input shapes to be fairly inexact, so as to be as pen-friendly and user-friendly as possible. This can be accomplished by incorporating error margins within the recognition algorithms. The idea behind using flexible error margins, which vary depending on the type and the size of the gesture drawn, is to ensure that the user is not penalized for inexact shapes. For instance, a circle recognition algorithm can allow the user to draw an input shape that resembles an ellipse more than a circle because it is not reasonable to expect an accurate circle from user input.

Also, a system can be configured with flexibility with respect to gesture recognition algorithms. This allows users to draw closed shapes even without the shape reflecting an accurate closed shape. Moreover, the two ends of the shape may not be necessarily joined end-to-end. This allows closed shapes with a small degree of incompleteness as acceptable.

A system that can handle the example of FIG. 3 may be utilized on many different types of computing devices 230.

Examples include computing devices with interactive screens like a tablet PC or a personal digital assistant (PDA). The tablet PC, for instance, can work as a tablet as well as a laptop. The interactive nature of the screen and the use of pen-based input devices enhance computing and can be utilized with the techniques disclosed herein. Other computing devices and their human-interface mechanisms can be utilized, such as a computer's keyboard and/or mouse (e.g., a mouse can be used to draw the gesture input).

Figure 4:
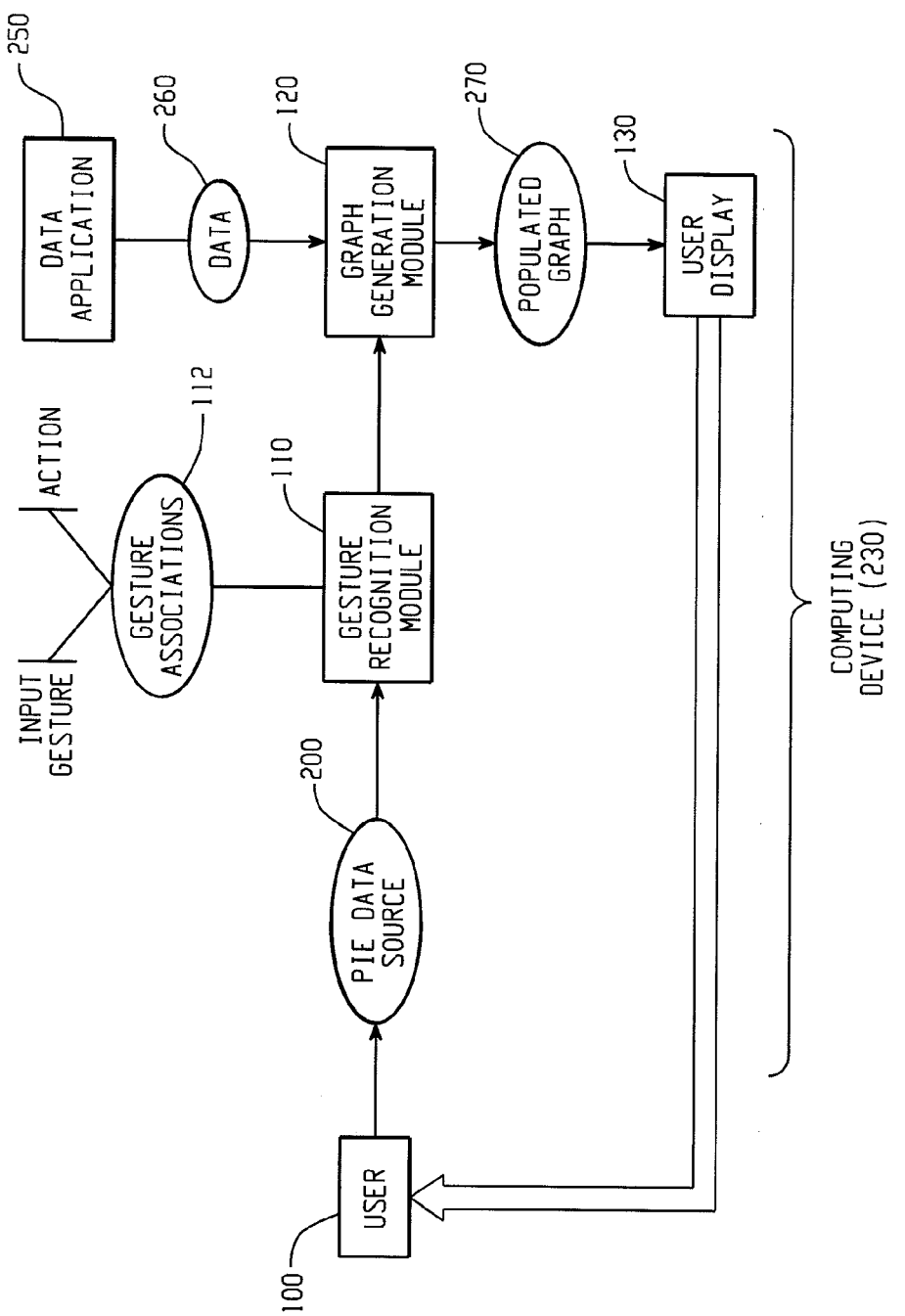
FIG. 4 is a block diagram illustrating data being used to populate a graph.

FIG. 4 illustrates that data 260 to populate a graph may be provided or retrieved from a data application 250. The data application 250 can reside locally on the computing device 230 or can be operating remotely from the computing device and accessible by the computing device 230 over a network. In the latter instance, the network can be any type of network, such as a local area network (LAN), a wide area network (WAN), an Internet, a wireless network, etc. The data application 250 can vary widely and may be as simple as a data file that contains the data 260 for populating the graph, or can be a relatively sophisticated program such as a data mining or statistical analysis application. The graph generation module 120 may perform additional processing upon the data 260 before providing the graph 270 populated with data to the user's display 130.

The user 100 can indicate a data source 240 to populate the graph for display on the user's display 130. However, it should be understood that other techniques can be used to determine what data 260 should be used in populating the graph. These may include the computing device 230 automatically determining the source of data without manual indication from the user 100.

To begin a graph creation operation, a user 100 typically starts with a blank window on the computing device's display 130. A user 100 can draw different gestures depending on the particular type of chart desired. The input gestures are recognized as graphic primitives or a command for a particular type of chart. If a chart has already been drawn, then the program can recognize that the gesture may denote an operation within a chart.

Figure 5:
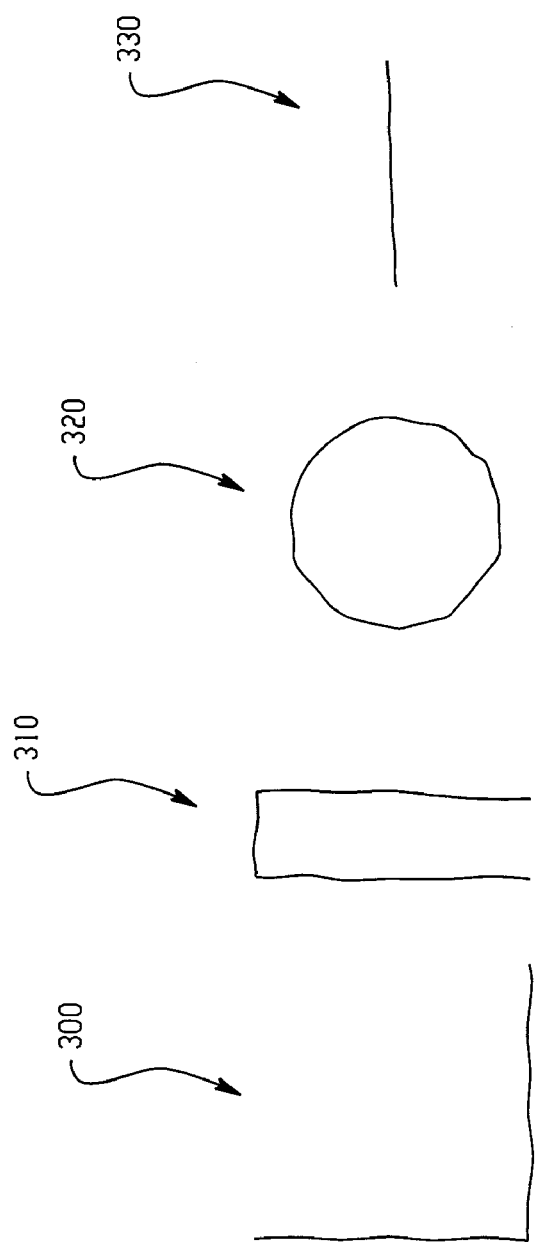
FIG. 5 provides several examples of possible gesture inputs from a user.

A system can be configured to recognize gestures that are partly intuitive, such as the gestures shown on FIG. 5:

Drawing an L shape 300 as an input on the window may denote the gesture for the program to draw coordinate axes and a coordinate system complete with labels and markers.

Drawing a three-sided bar shape 310 may denote that the user wants a bar chart, and the program then draws a default bar chart with values and labels that can be edited.

Drawing a circle 320 may denote that the user wants a pie chart to be drawn by the program.

Drawing a line 330 may denote that the user wants to view a list of line charts available for display.

Each of these gestures may have its own recognition algorithm as well as mode of operation. When an input is provided using the pen, the particular gesture is parsed and recognized, and the associated chart primitive is executed. The system can be configured such that depending on the mode of operation, each gesture is uniquely associated with a specific graph drawing primitive. The program creates the desired graph, by recognizing the user command chiefly or solely from the input gesture from the user, and may be without requiring any other information from the user.

Figure 6:
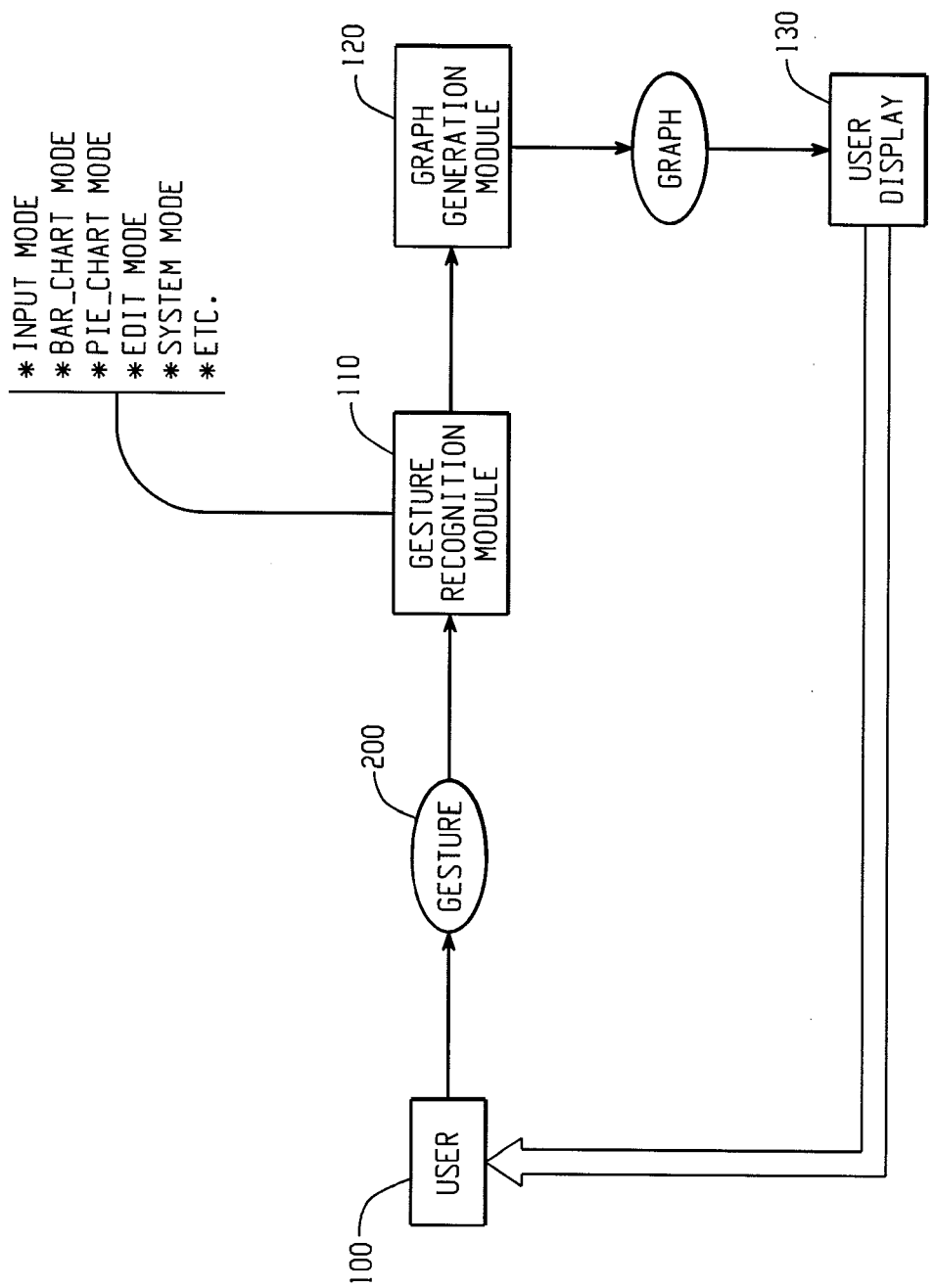
FIG. 6 is a block diagram illustrating different modes under which a graphic handling system may operate.

FIG. 6 illustrates that a graphic handling system may operate under different modes:

1. INPUT mode: in this mode the program awaits user input to be provided.
2. BAR_CHART mode: this mode contains sub-modes like SIMPLE_BAR, STACKED_BAR and GROUP_BAR.
3. PIE_CHART mode: this mode is for drawing a Pie Chart.
4. EDIT mode: in this mode, the charts drawn can be modified and manipulated by user.
5. SYSTEM mode: This is the mode for drawing the coordinate axes when the L-shape is recognized.

The program can recognize that basic geometric shapes like circles, rectangles, lines, and three-sided bars are characterized by a certain pattern or equations. These equations and patterns can be incorporated in recognition algorithms for each input shape or gesture.

When the user draws a shape as input, the input stroke or gesture is sampled in order to approximate the input shape. This is done, at least in part, to speed up the recognition process. The points and line segments that connect these points are used to internally maintain the approximate shape of the input. This approximate shape is then matched to the equations and patterns by the recognition algorithms, in order to find the pattern that matches the given input pattern.

Figure 7:
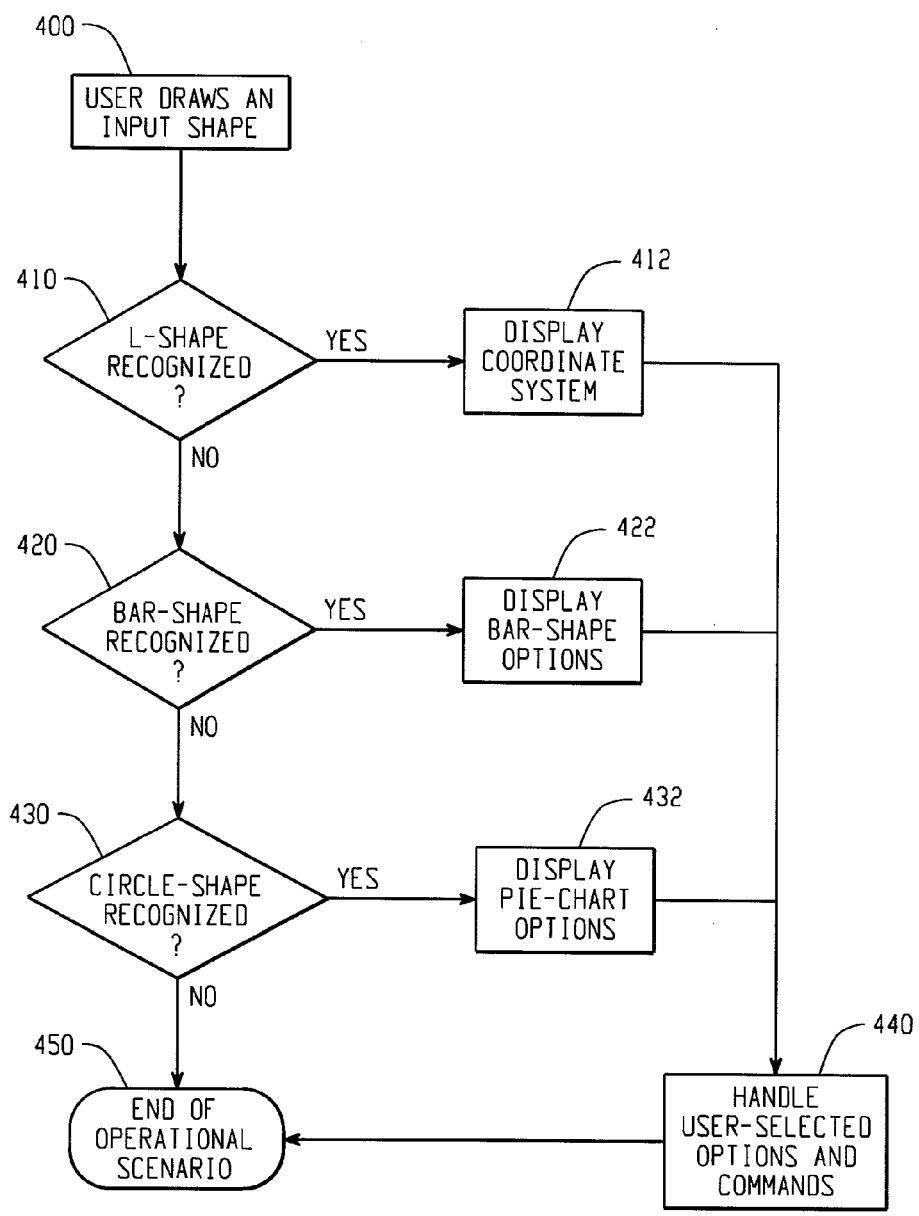
FIG. 7 is a flow chart depicting an operational scenario for handling input gestures from a user.

More specifically, FIG. 7 shows an operating procedure for recognizing and handling input gestures from a user. Starting with a blank screen, a user at step 400 draws an L-shape, or a bar-shape, or a circle-shape. If an L-shape is drawn and recognized at decision step 410, the screen displays at step 412 a coordinate system with category and response names on the X and Y axes respectively, and processing continues at step 440.

If a bar-shape is drawn and recognized at decision step 420, the program at step 422 prompts the user with a dialog screen containing various bar chart options: Simple Bar Chart, Stacked Bar Chart, and Group Bar Chart, and processing continues at step 422.

If the circle-shape is drawn and recognized at decision step 430, the system displays at step 432 a standard pie-chart that can be edited and modified.

Any options or commands selected or provided by the user with respect to a recognized gesture primitive are handled at step 440. For example, when a specific bar chart option is chosen, the program displays that chart on the screen. Upon clicking on any of the text displayed as labels, categories or responses the program can open an edit window to allow the user to modify the existing text in those boxes.

As another example, drawing a horizontal delete stroke across the category names below the bars comprising the bar chart will not only delete the category names but also remove the corresponding bars from the bar chart from being displayed.

It should be understood that similar to the other processing flows described herein, the steps and the order of the steps in the flowchart described herein may be altered, modified, deleted and/or augmented and still achieve the desired outcome.

Figure 8:
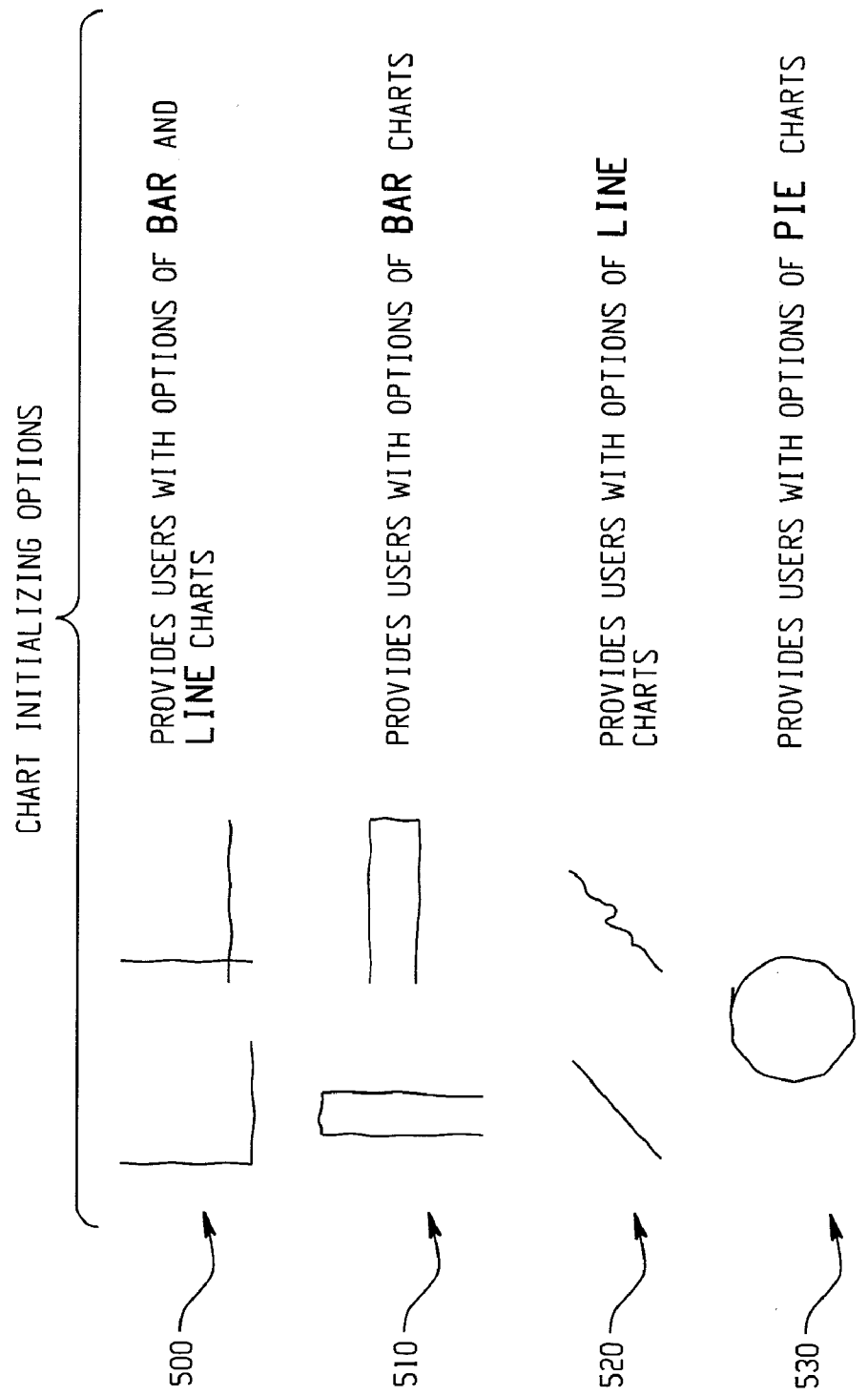
FIGS. 8-27 provide examples of generating graphic primitives for use in creating business-level quality graphs.

FIGS. 8-27 provide examples of generating graphic primitives for use in quickly creating business-level quality type graphs. FIG. 8 illustrates several chart initializing options available to a user. The gesture inputs shown at 500 provide a user with different options of bar and line charts. The gesture inputs shown at 510 provide a user with different options of bar charts. The gesture inputs shown at 520 provide a user with different options of line charts. The gesture inputs shown at 530 provide a user with different options of pie charts. It should be understood, a gesture input could be used to directly draw a type of chart on the user's interface, without first providing a list of options to the user.

Figure 9:
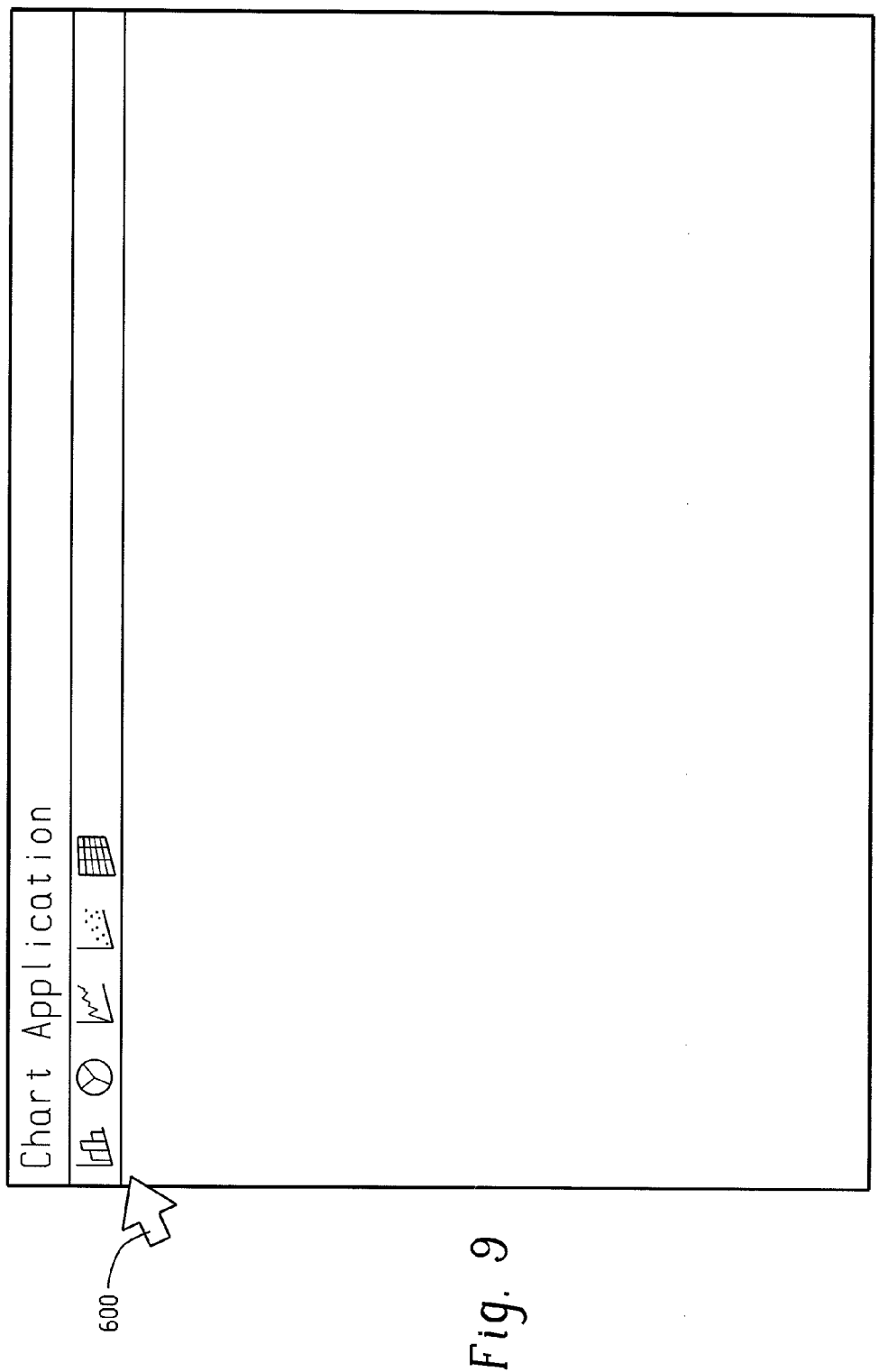
Figure 10:
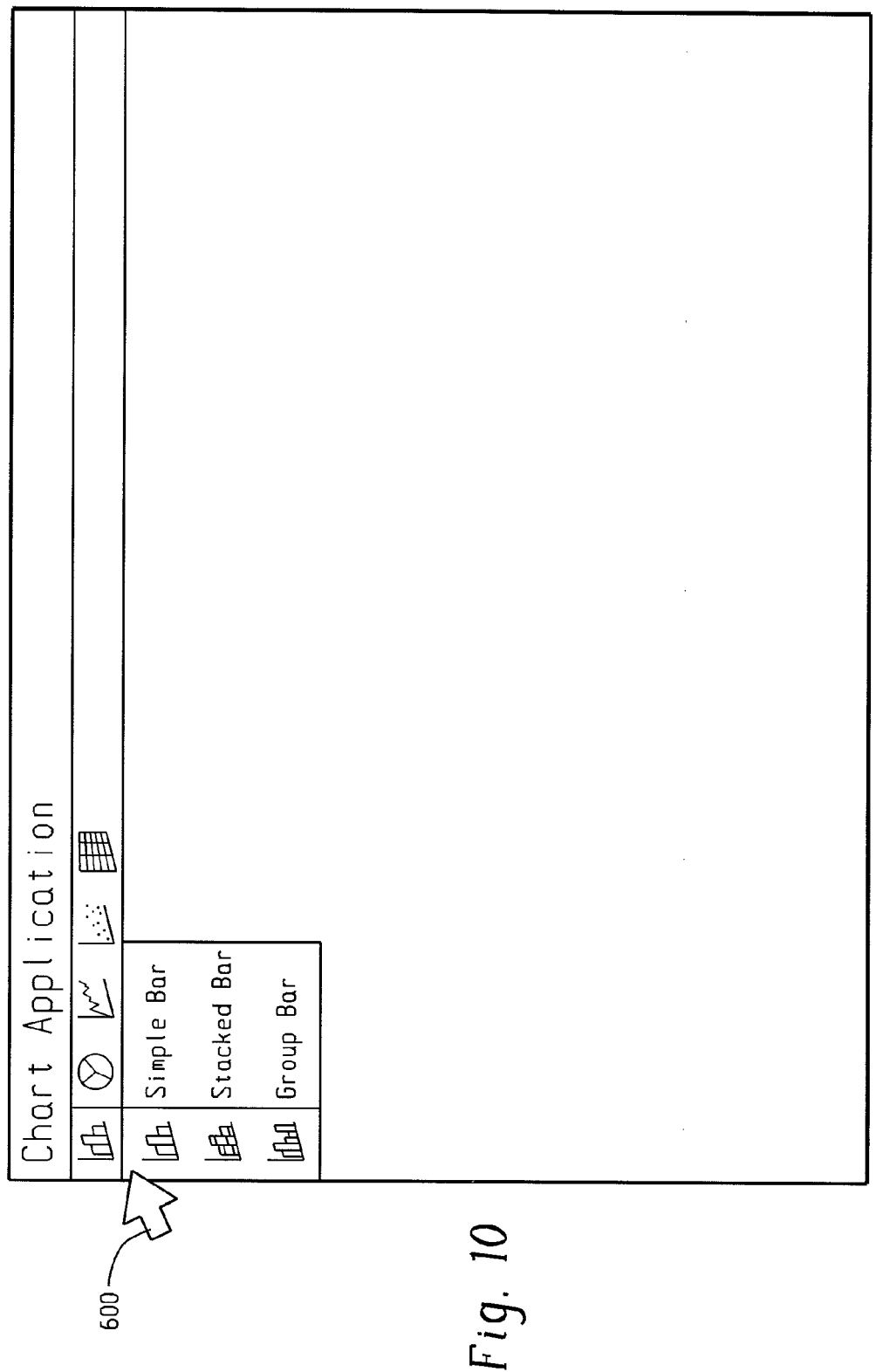

FIG. 9 illustrates an approach wherein a user does not have to initially provide an input gesture in order to generate a chart. As shown at 600, a user can click on the bar chart icon, and be presented with a list of bar chart options as shown on FIG. 10. The user is then able to proceed to interact with the computing device to create and edit a bar chart.

Figure 11:
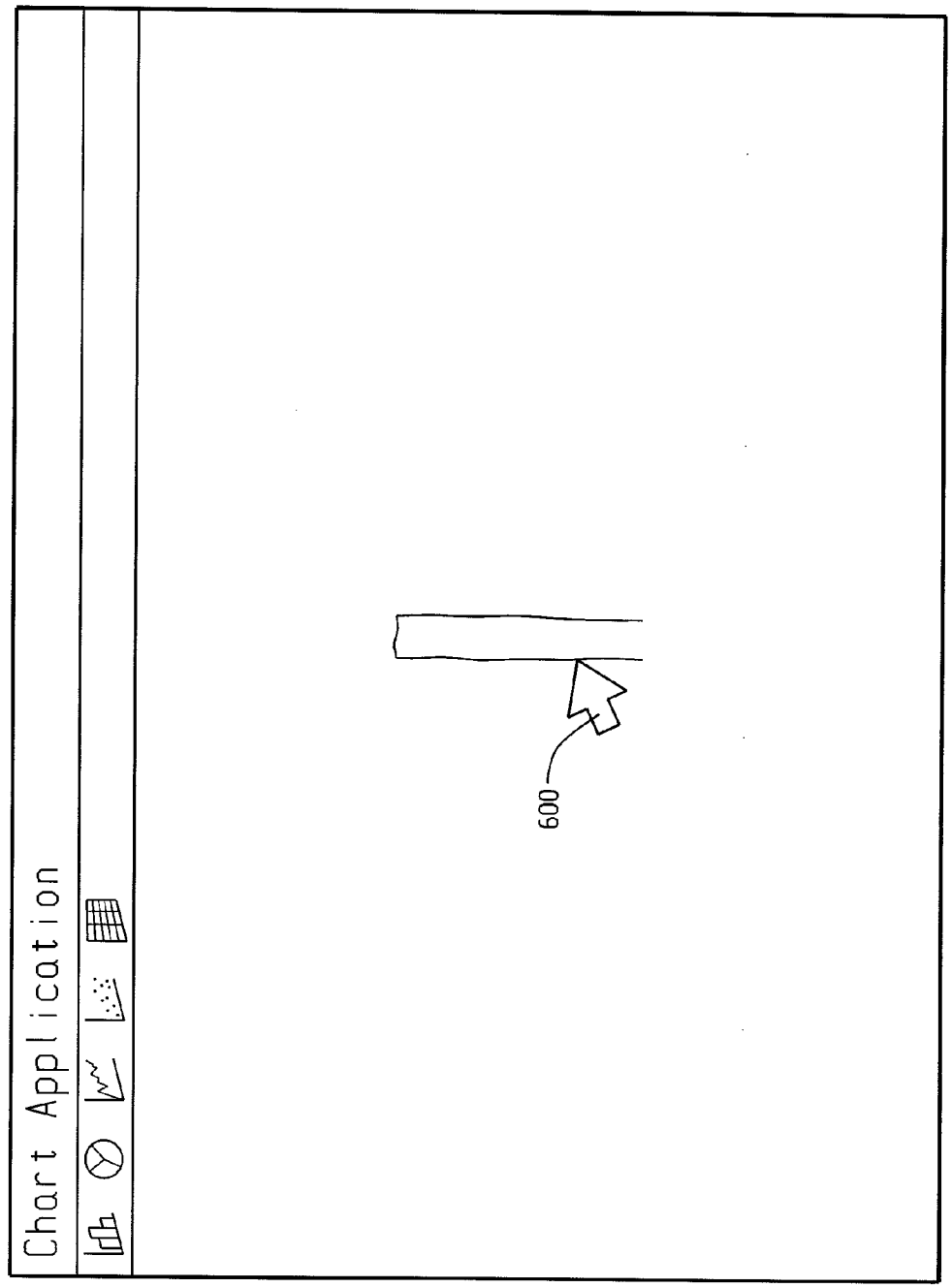
Figure 12:
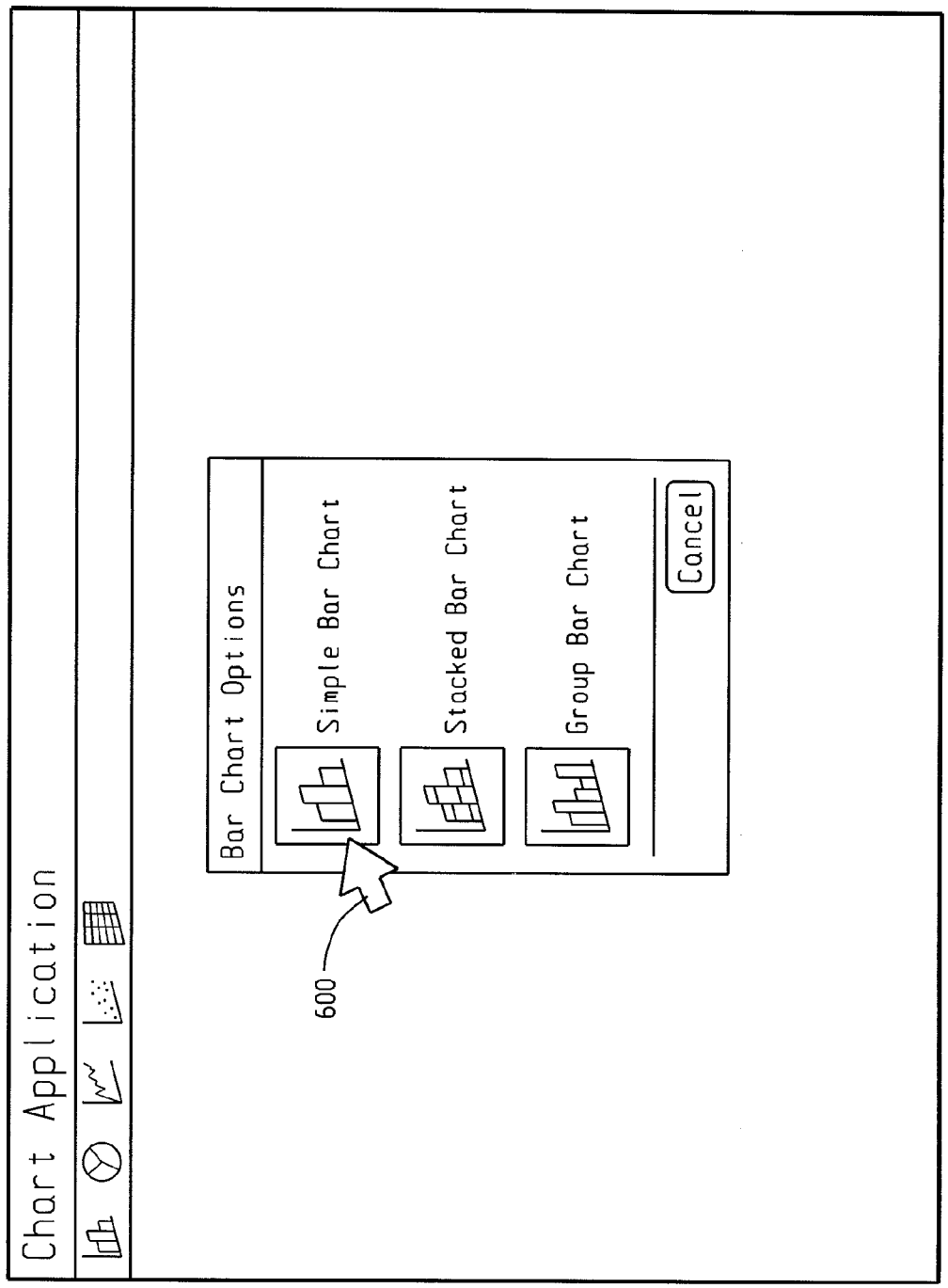

As another approach and through use of the options shown FIG. 8, FIG. 11 illustrates at 600 a user providing a gesture input to the computing device to indicate that the user wishes to see a listing of bar chart options. After the gesture input of FIG. 11 has been recognized and processed, FIG. 12 shows a listing of all bar chart options being displayed to the user as shown on FIG. 13. After the bar chart graphic primitive has been displayed to the user, a user can then edit an aspect of the graphic primitive, such as the category name of the graphic primitive's horizontal axis.

Figure 13:
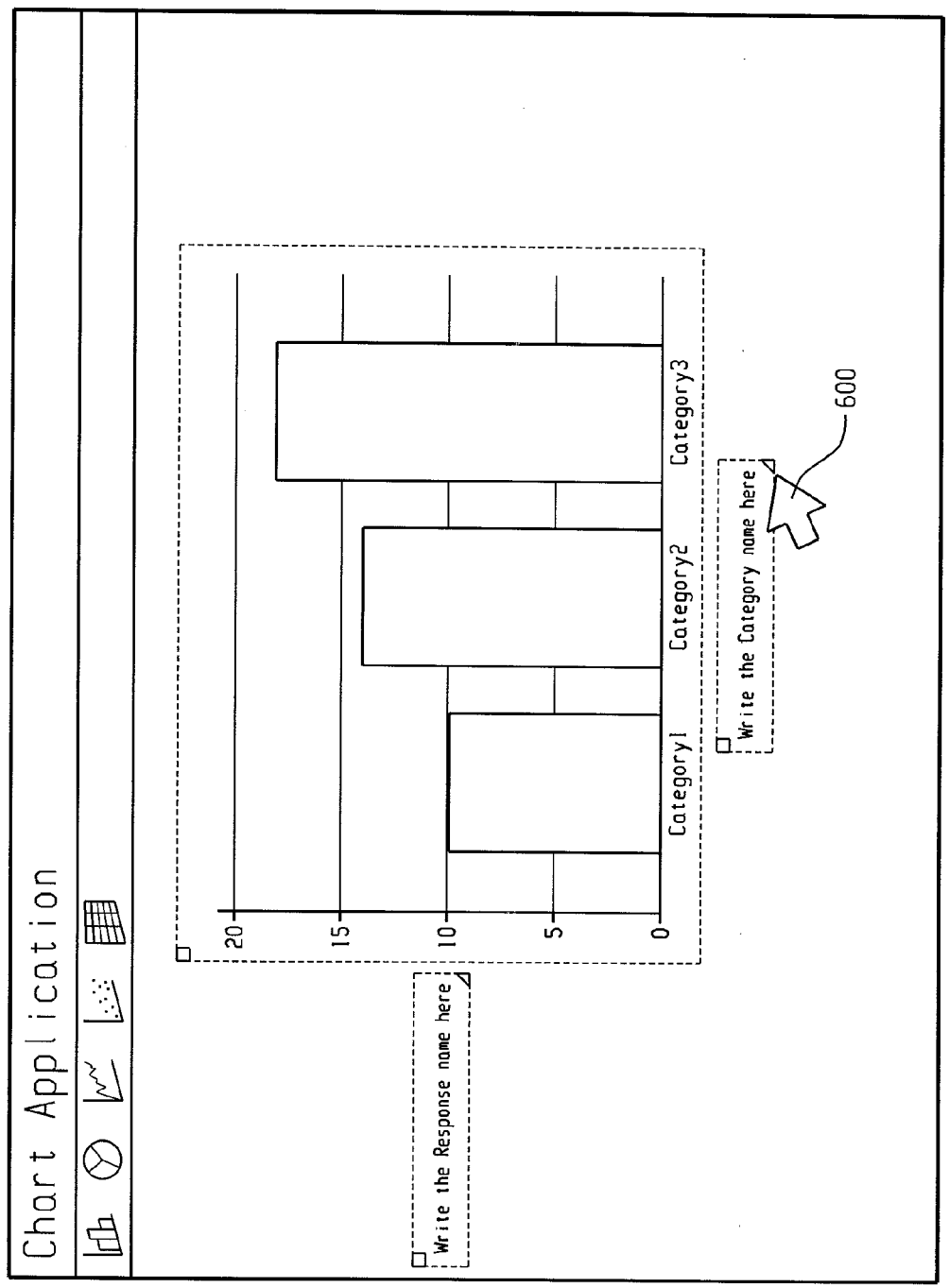
Figure 14:
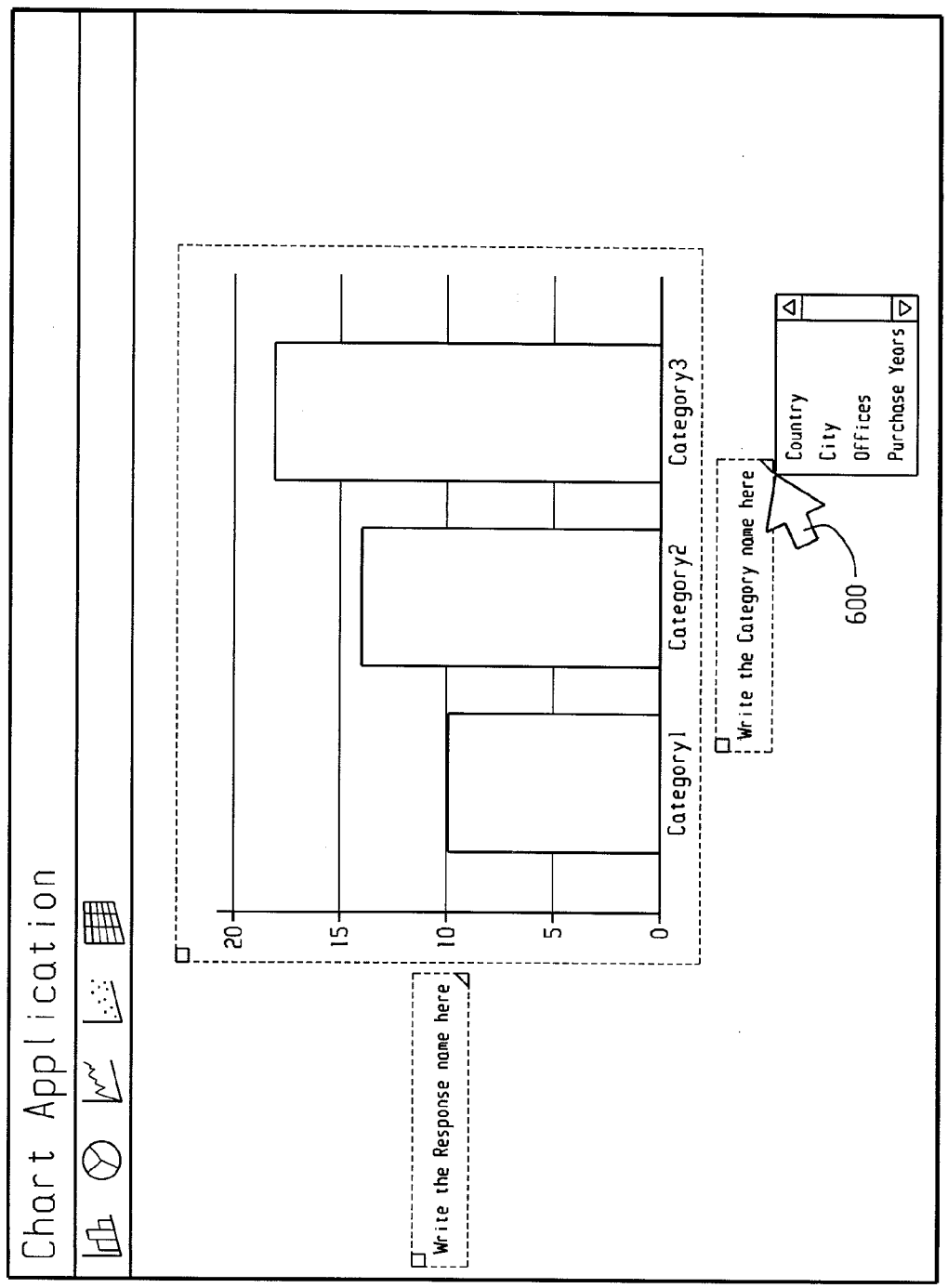
Figure 15:
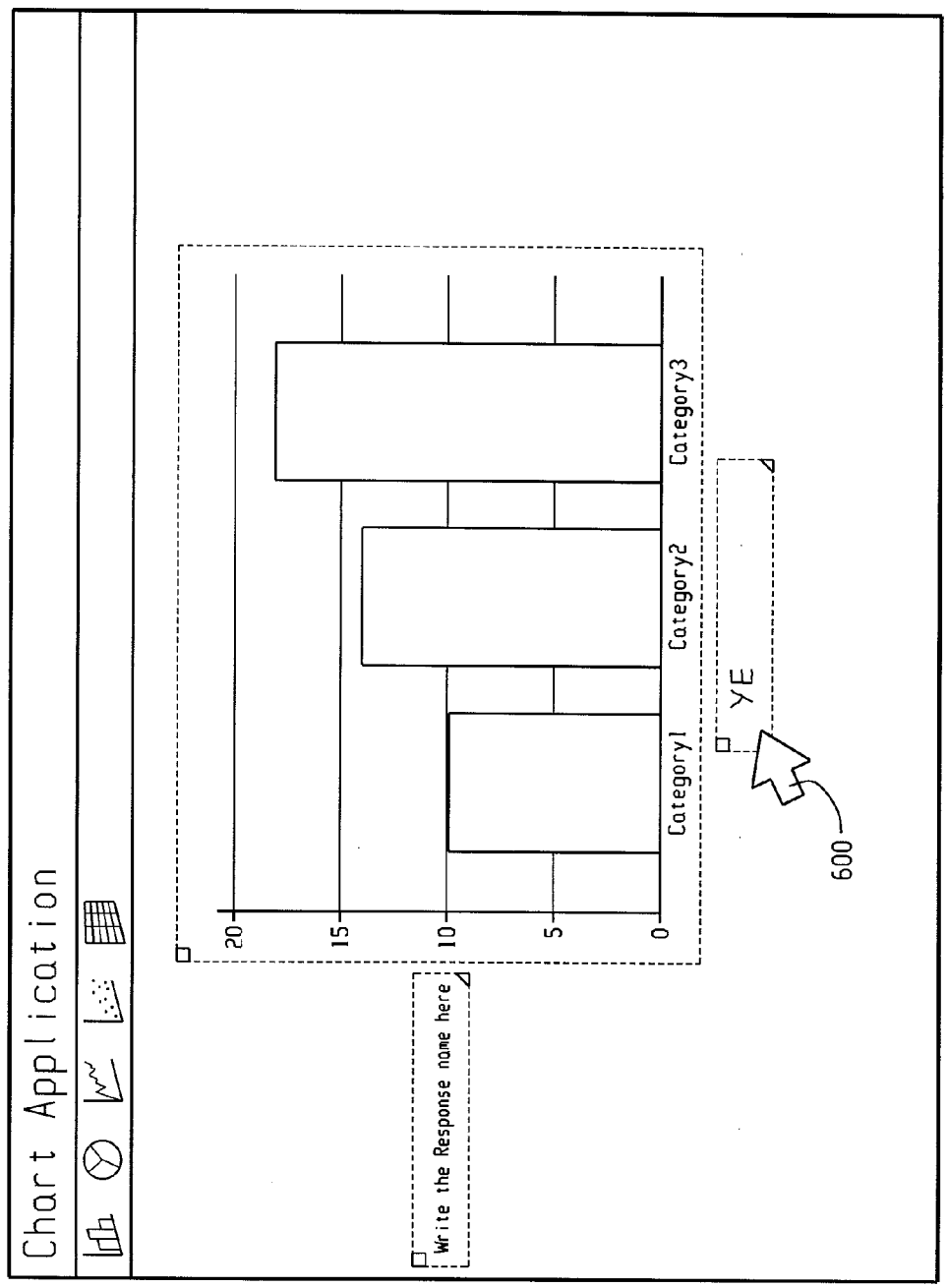
Figure 16:
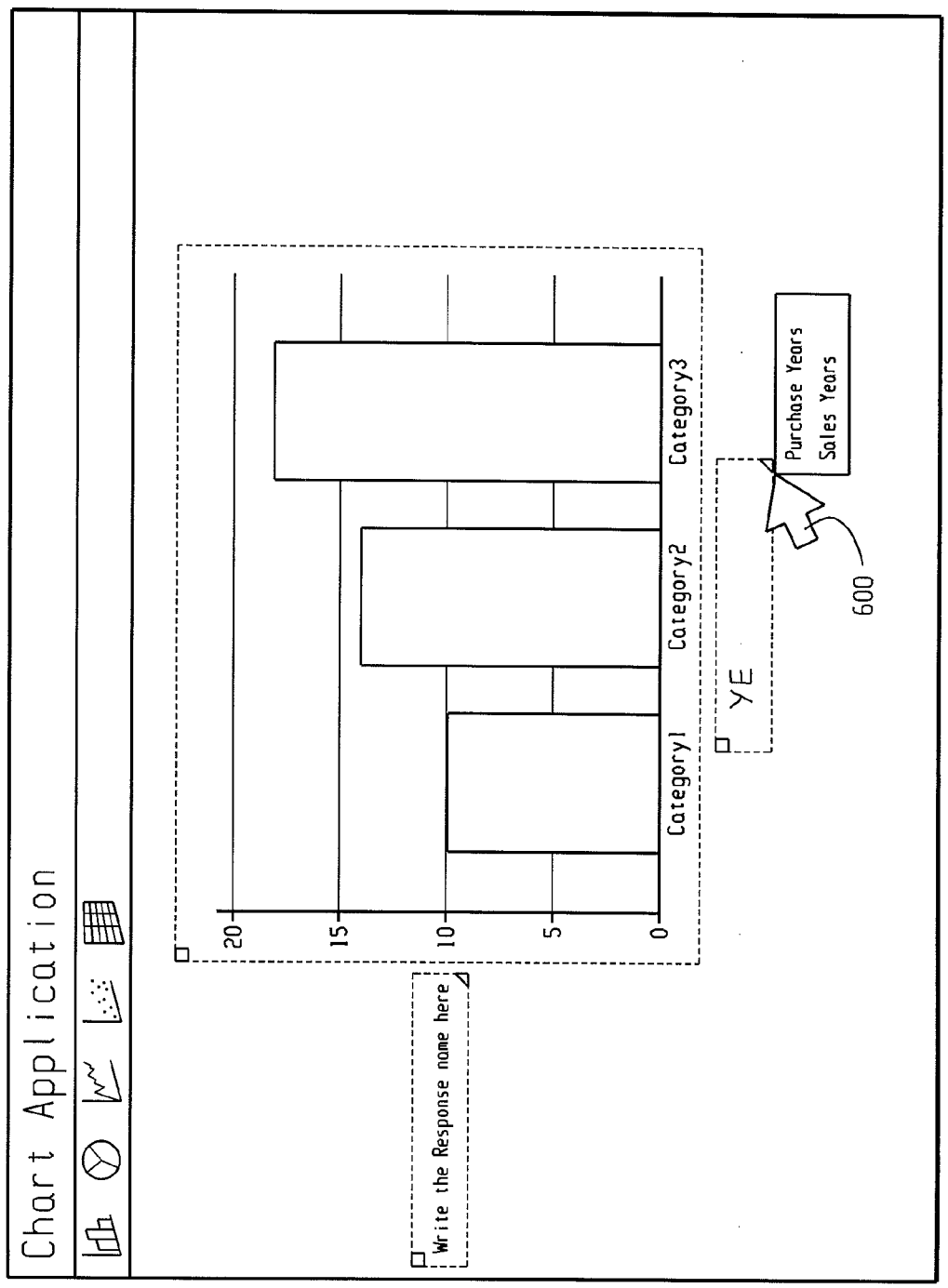
Figure 17:
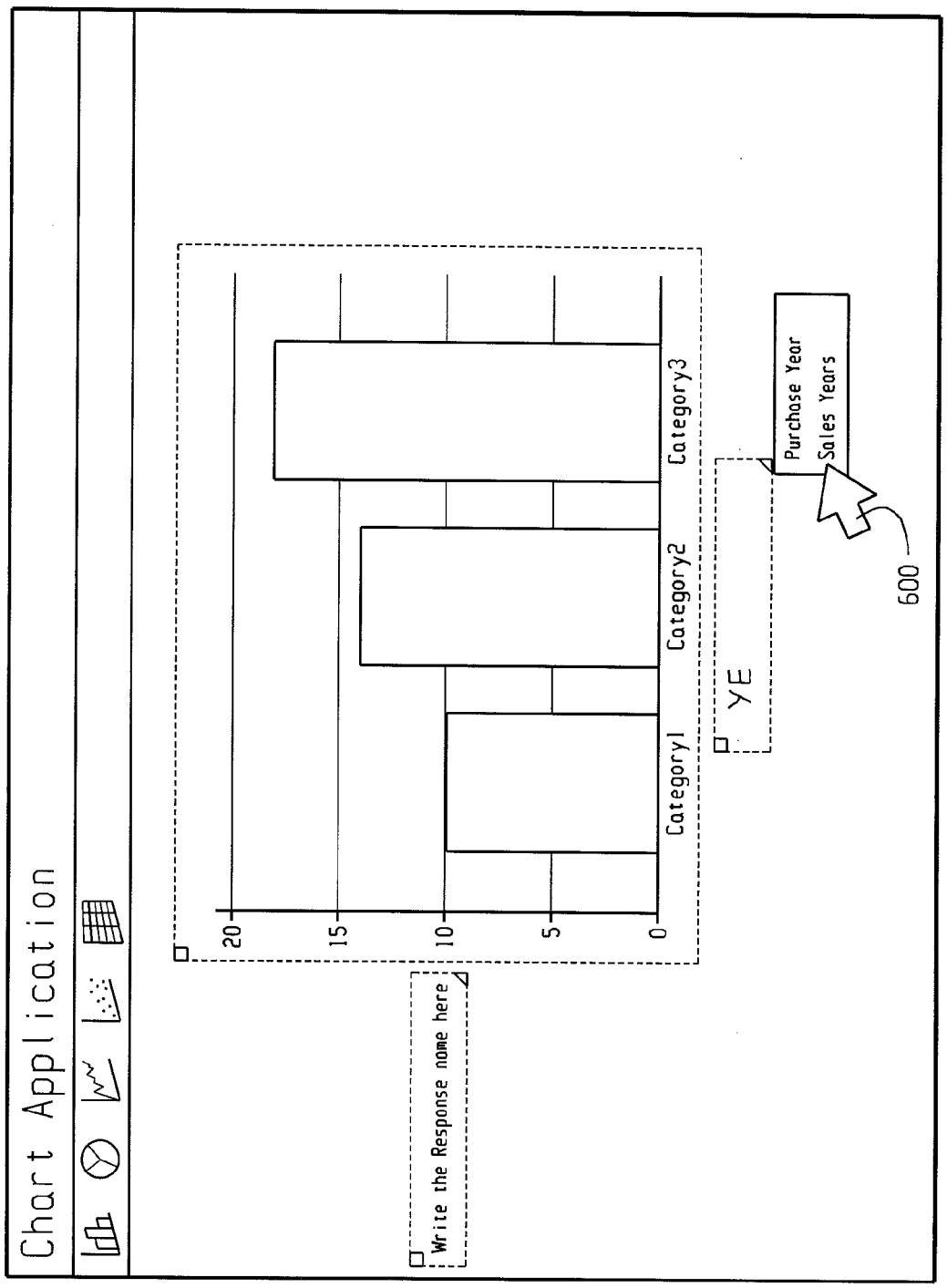
Figure 18:
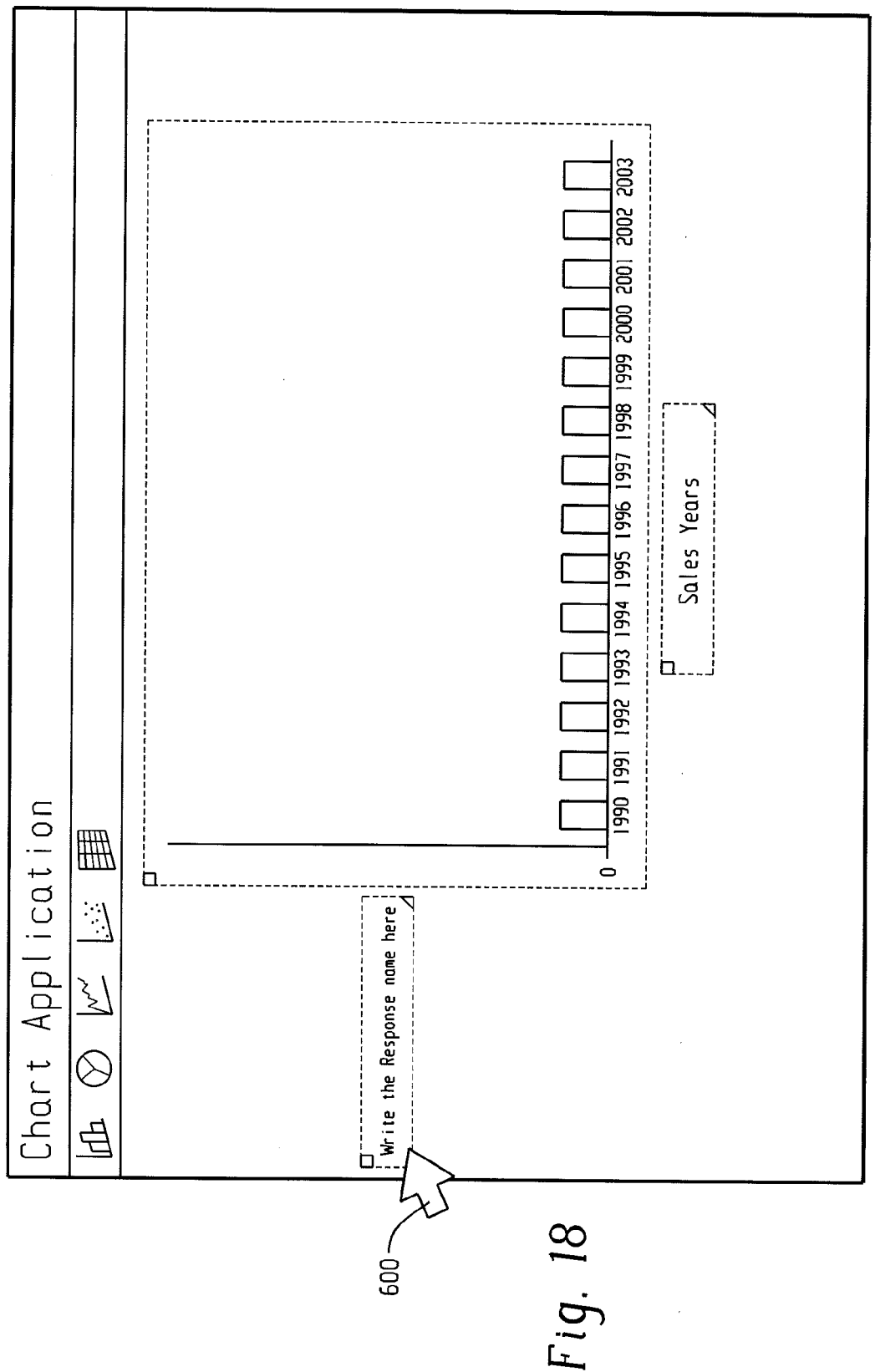
Figure 19:
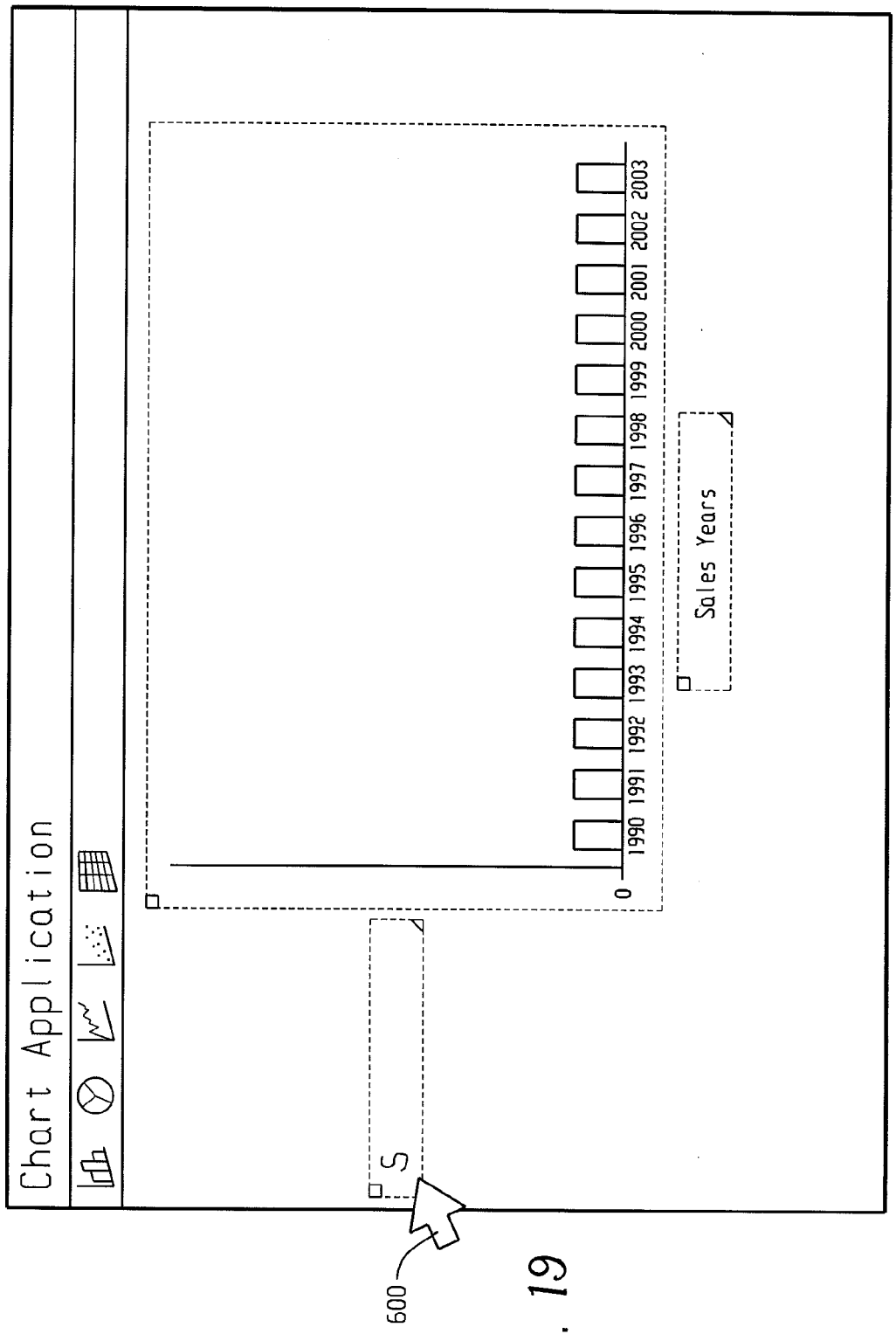
Figure 20:
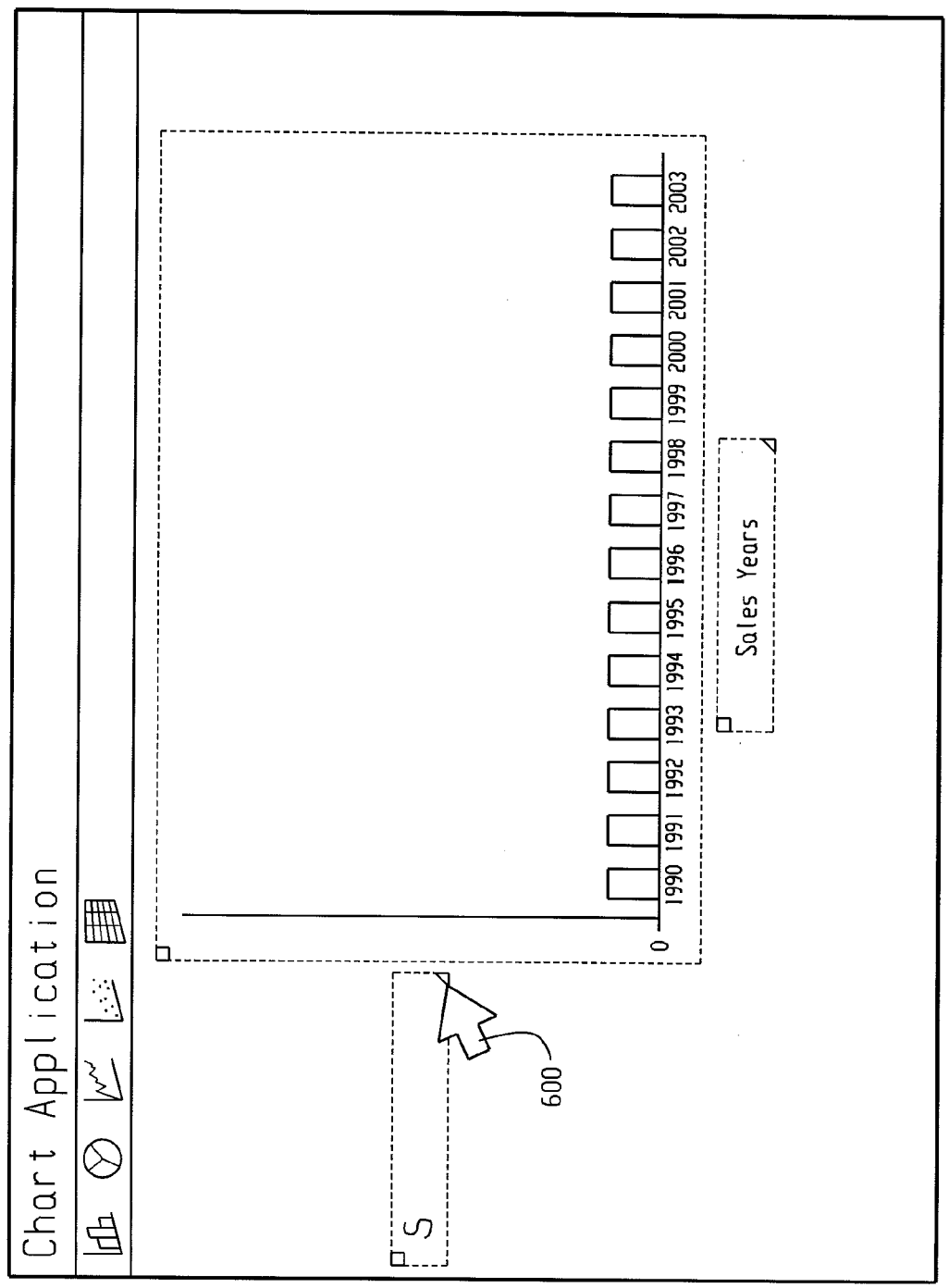

By selecting a corner of an input box, such as shown at 600 on FIG. 13, a pull-down box filled with possible categories is provided to the user as shown on FIG. 14. The user can specify the category name from the list. The list may be generated based upon previous values that the user has entered into the computing device, or as another example may be generated automatically from a database that contains acceptable category values for a graph. As shown at 600 on FIG. 15, the user can filter the selection provided in the pull-down box by penciling in another input, such as "YE" which narrows the display of possible category names to only those entries that contain "YE." The result of the filtering is shown at 600 on FIG. 16 wherein the possible candidates have been narrowed down to "Purchase Year" and "Sales Years." The user selects as shown at 600 on FIG. 17 the latter candidate, and accordingly the term is used as the category name of the graph's horizontal axis. The results of these operations upon the horizontal axis are shown on FIG. 18. It is noted that the user could also pencil in or type in manually a value not listed in the pull-down box.

Figure 21:
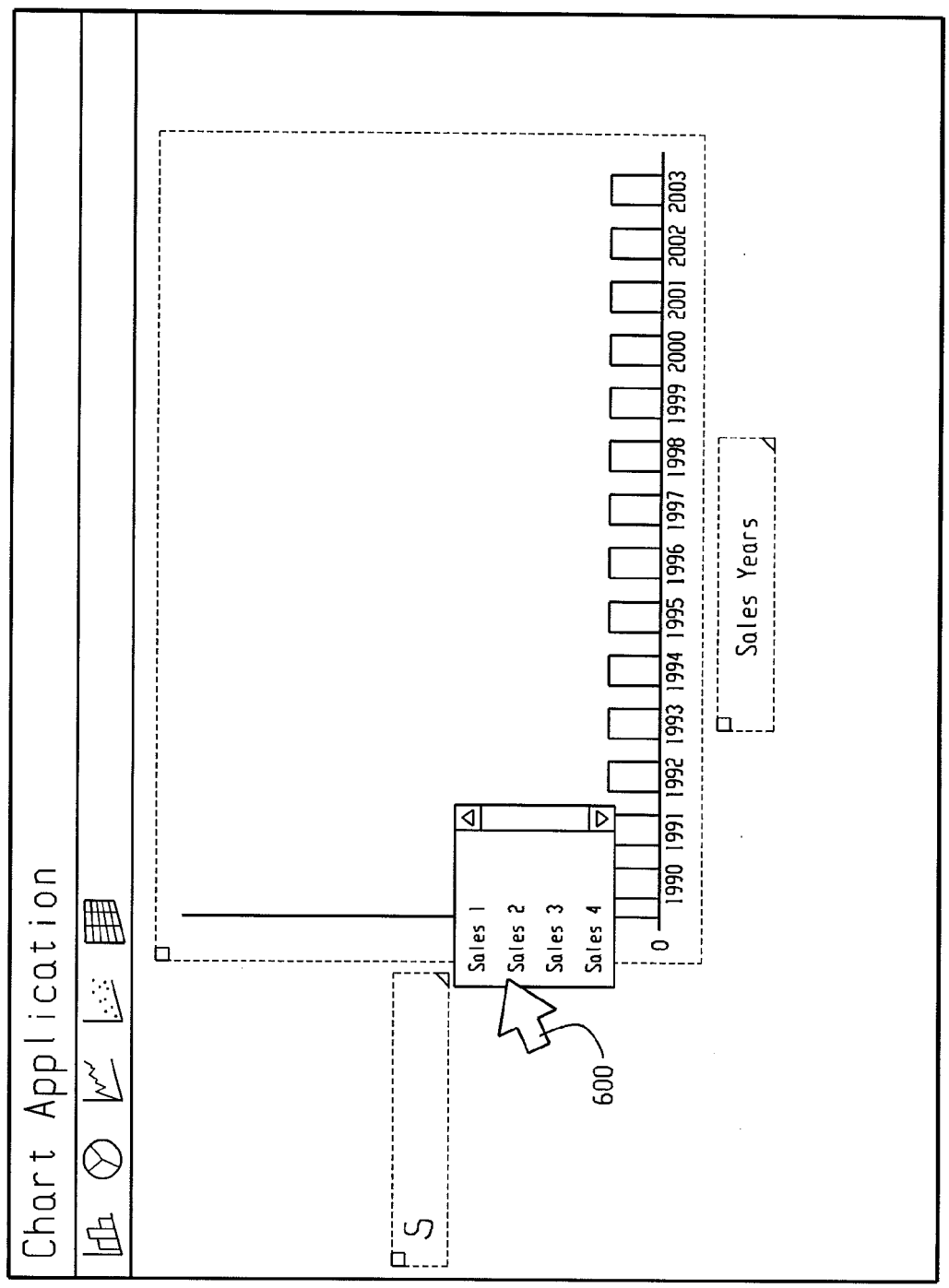
Figure 22:
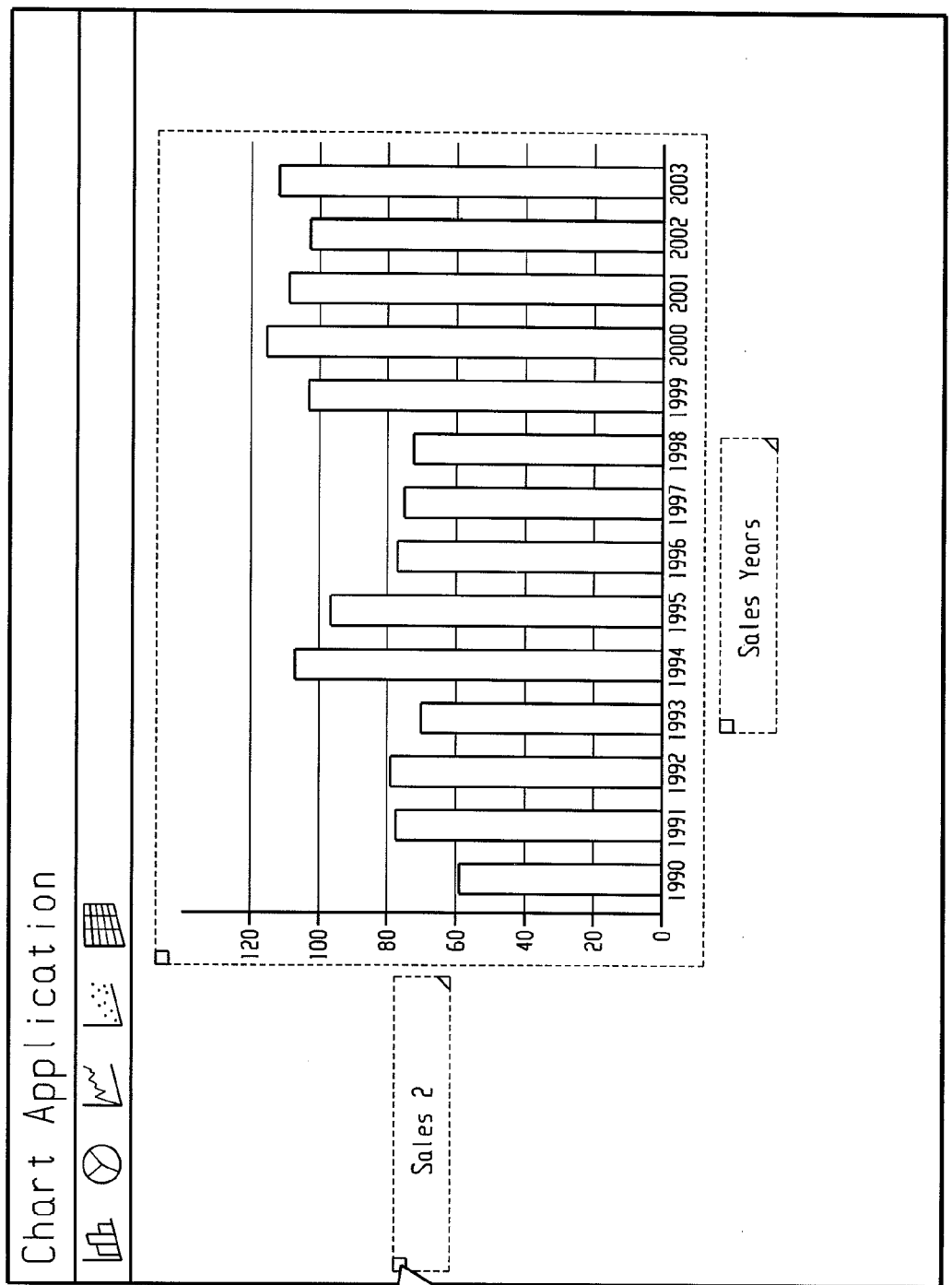

The process is essentially repeated for the vertical axis of the graph. As shown at 600 on FIG. 19, the user pencils the letter "s" and activates the corner of the category input region as shown on FIG. 20. Activating the corner of the region activates the vertical axis pull-down box. Within the pull-down box, FIG. 21 shows the category name candidates that contain the letter "s." FIG. 22 shows that the user has selected "Sales 2" as the category's name.

Figure 23:
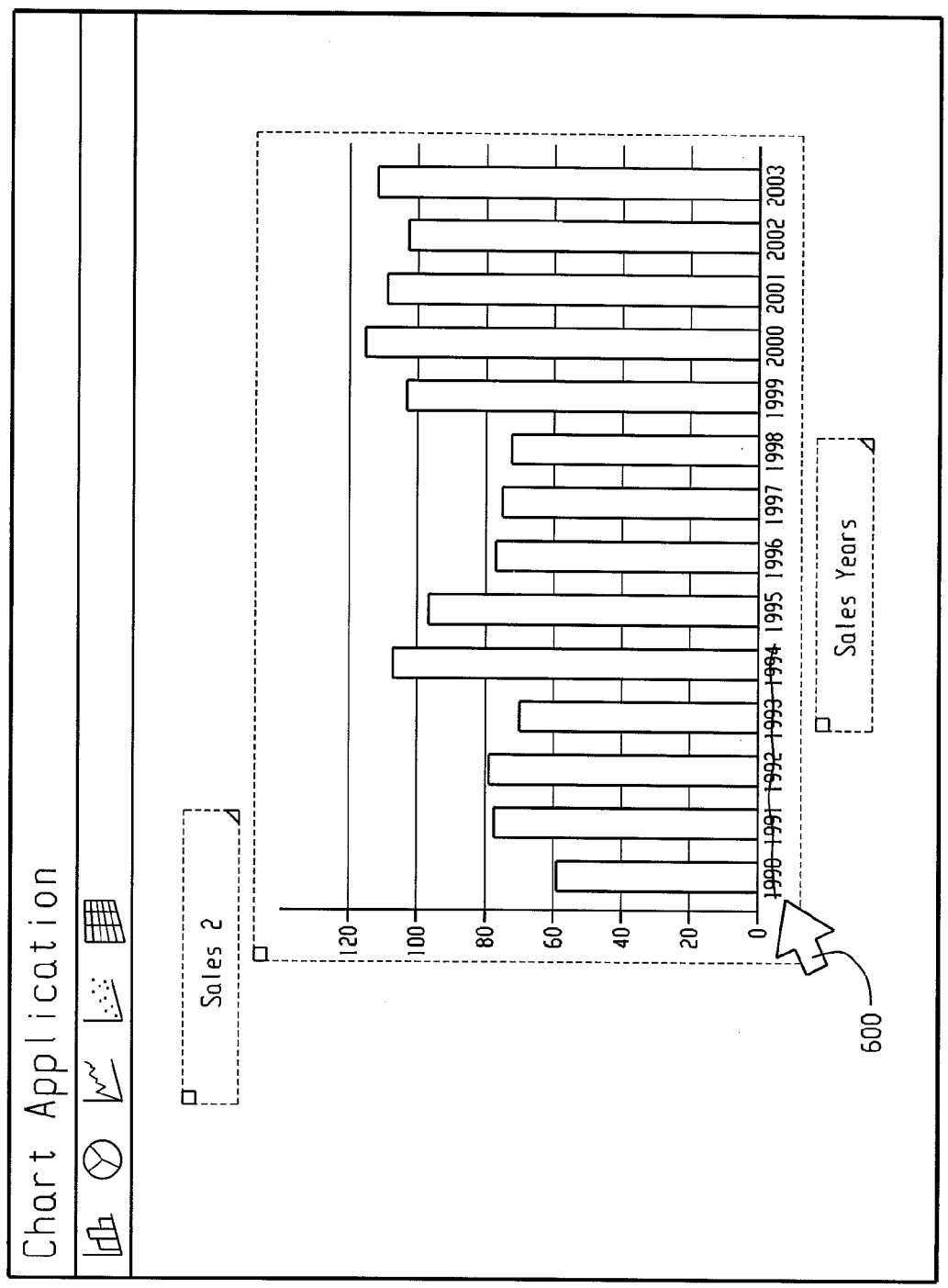
Figure 24:
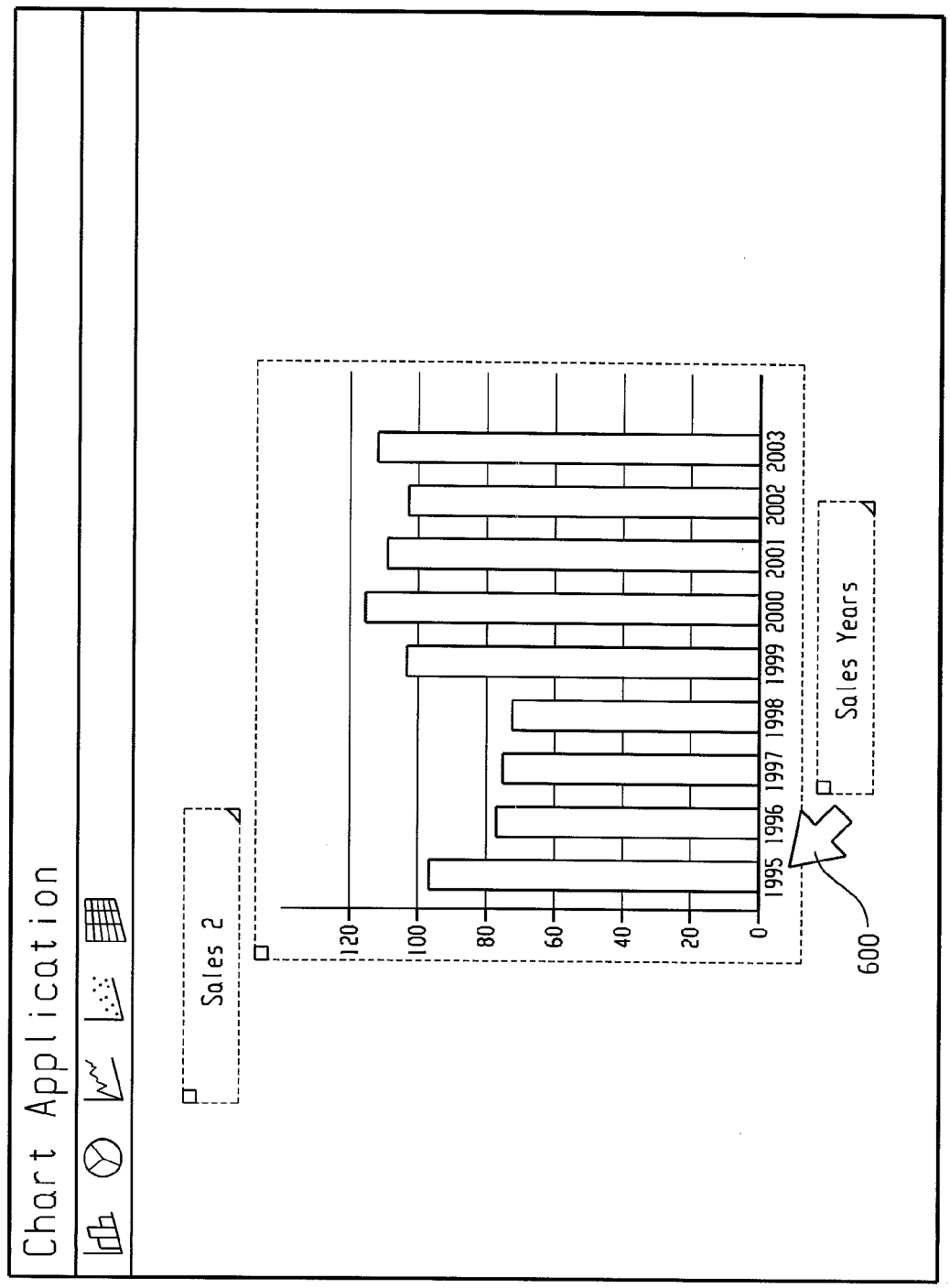
Figure 25:
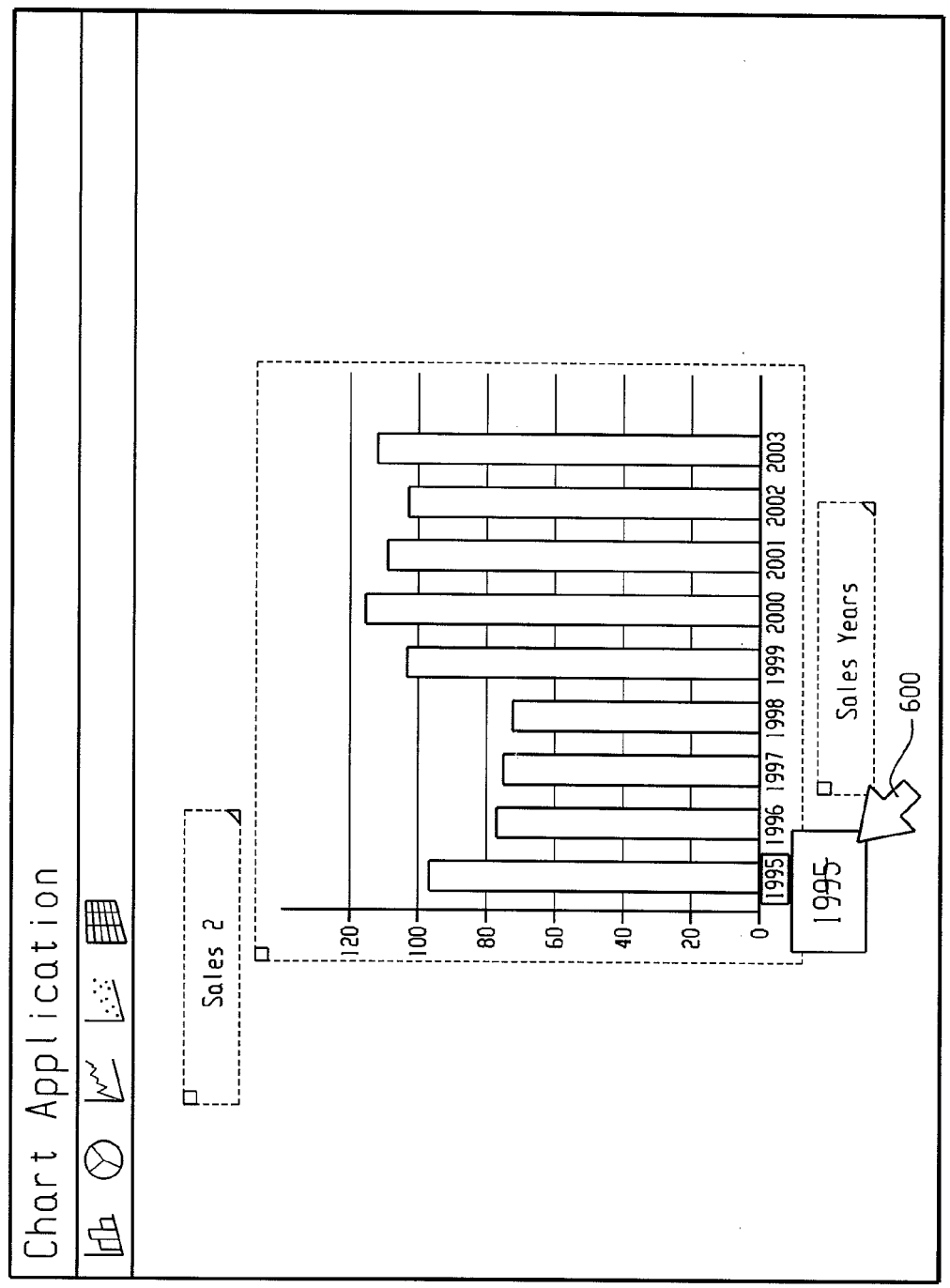
Figure 26:
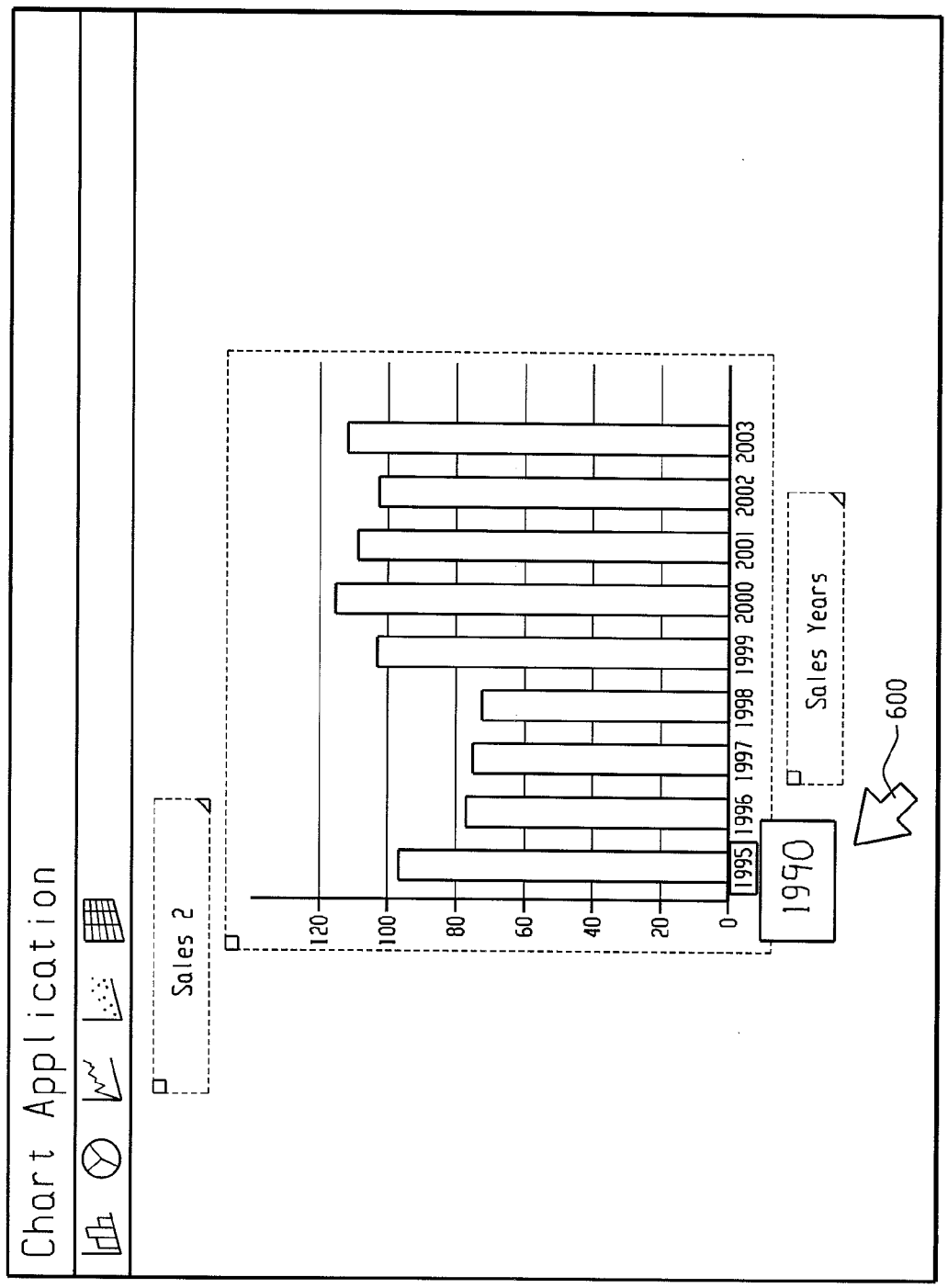
Figure 27:
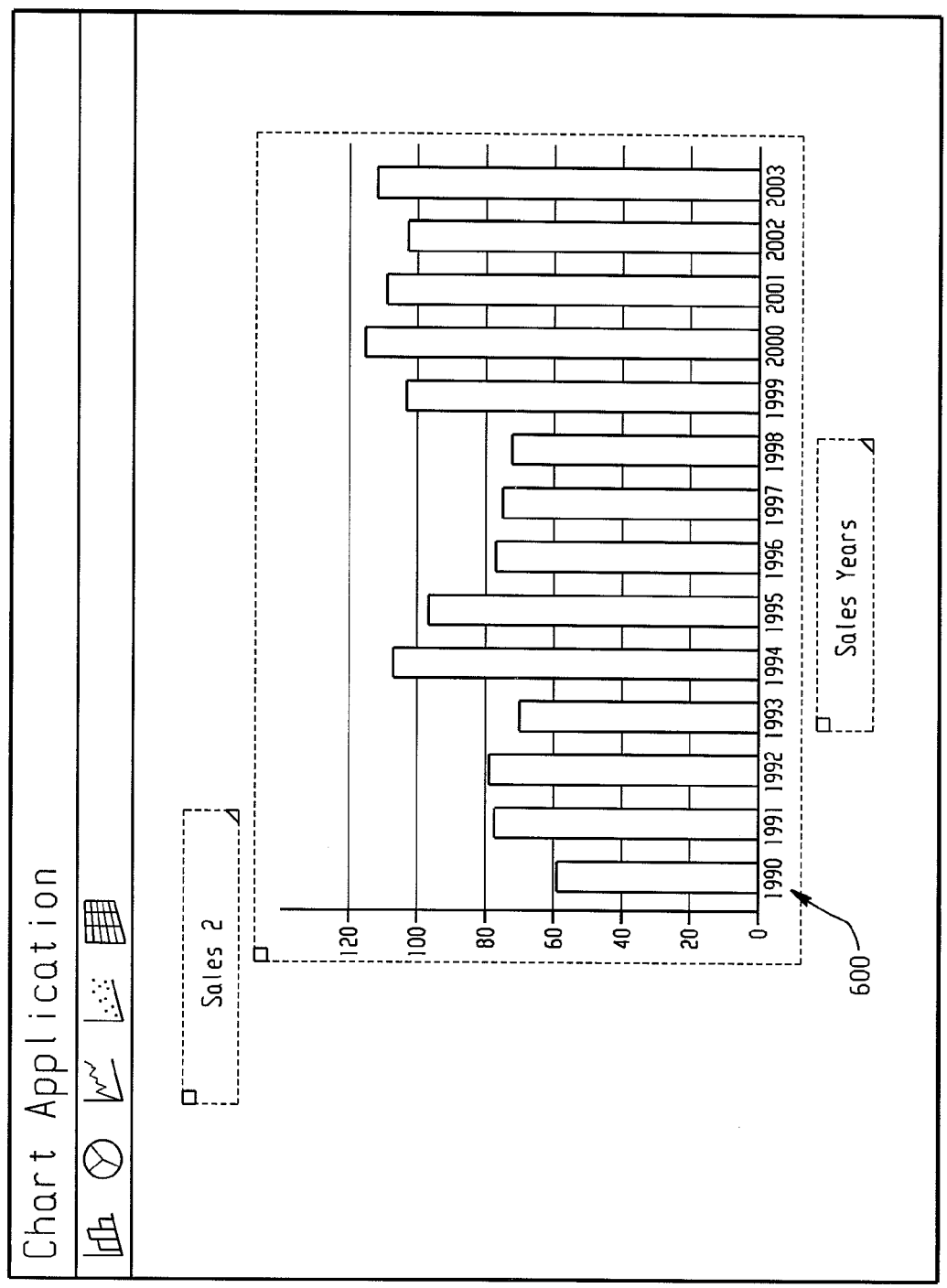

It should be understood that the user can perform many different types of edits (e.g., annotations, graph data value specification, etc.) with respect to a graph. For example, FIG. 23 shows that a user has utilized a mouse or a tablet's pen to strike out certain values provided on horizontal axis of the graph. Striking the years by the user provides an indication that the graph should not contain these years, and accordingly a graph without those years is displayed as shown in FIG. 24. As another example, FIG. 25 shows a user modifying a value on an axis so that the graph can be modified to display data from different years. In this example, the user has struck out the digits "95" from the category's axis value of "1995." As shown in FIG. 26, the user then writes in the digits "90" to indicate that the axis should begin from the year "1990." This user input is processed, and the updated graph is generated and displayed to the user as shown in FIG. 27.

While examples have been used to disclose the invention, including the best mode, and also to enable any person skilled in the art to make and use the invention, the patentable scope of the invention is defined by claims, and may include other examples that occur to those skilled in the art. For example, the systems and methods can provide for context-based determination of how to interpret the gesture and can be used with many different software packages, such as inserting a generated graph into a spreadsheet program, word processing program, presentation program, or an e-mail program as an object.

Figure 28:
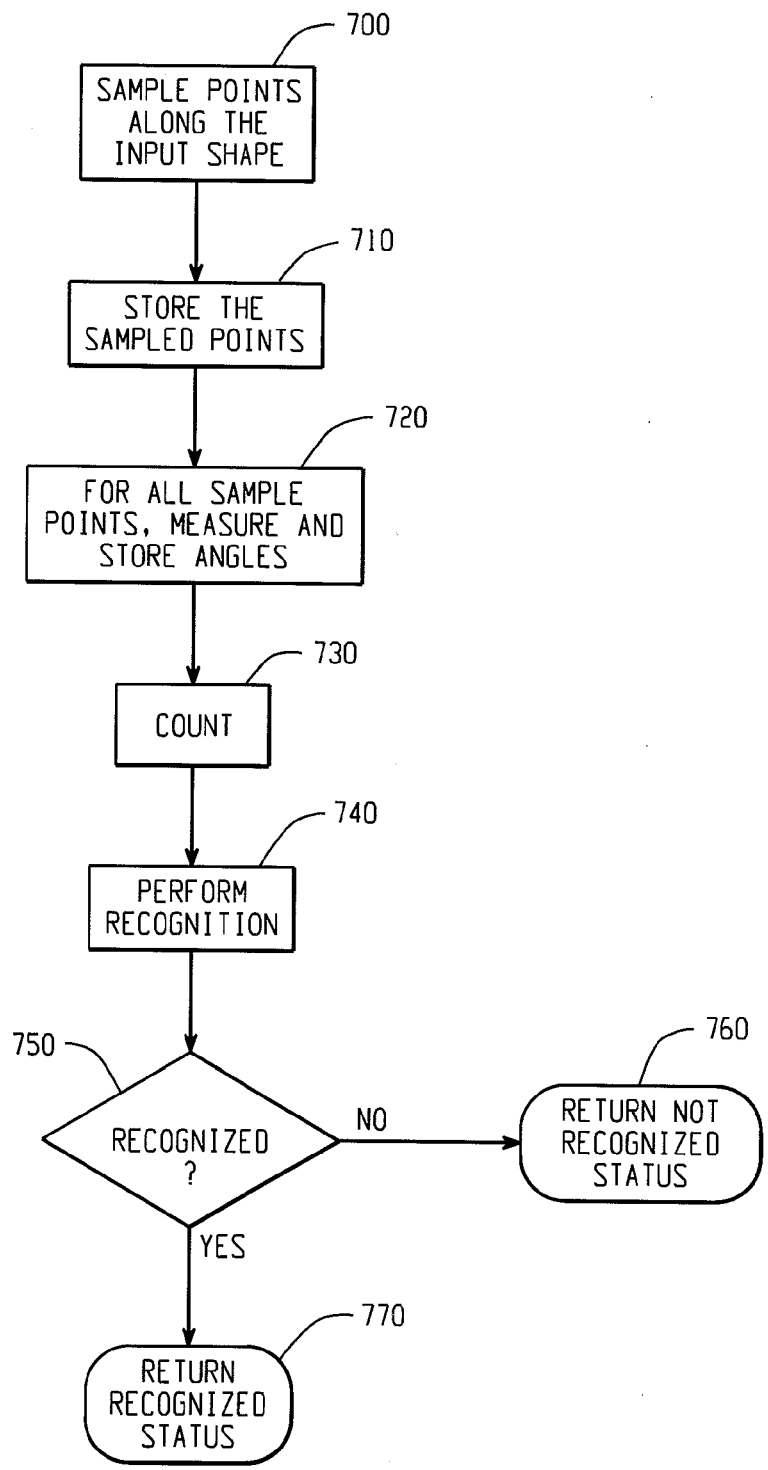
FIG. 28 is a flow chart depicting an operational scenario for recognizing input gestures from a user.

As another example of the broad scope of the systems and methods disclosed herein, many different recognition algorithms can be used. FIG. 28 shows but one example of a recognition algorithm that can be used to determine what type of input gesture a user has provided. The patterns for some of the shapes recognized by the algorithm of FIG. 28 include combinations of vertical and horizontal components, and intermediate (neither vertical nor horizontal) components if they exist. A vertical component (V) is the part of the stroke that is approximately perpendicular to the X-axis of the screen drawing area. Likewise, a horizontal component (H) is one that is approximately parallel to the X-axis of the screen drawing area. Segments that are neither horizontal nor vertical can be categorized as intermediate.

With reference to FIG. 28, points are sampled at step 700 along the input shape as it is drawn on the screen. At step 710, the sampled points are stored, and at step 720, the following determinations are performed for all sample points:

Measure angle (A) made by each line segment that connects two consecutive sample points.

Store angle as either V ($75<=A<=100$), or a H ($0<=A<=20$), or Intermediate (I). A series of V segments in succession denotes a V component. Likewise, for H component (series of H segments) and I (series of I segments) component.

Step 730 counts the total number of:
  a. V segments and V components,
  b. H segments and H components,
  c. I segments and I components.

At step 740, the following sub-steps are performed for recognition purposes:
  a. Determine if the input shape is a closed shape or an open shape or a single point.
  b. If Open-Shape:
    i. Test if it is an L-shape.
    ii. If not, test if it is a bar-shape.
    iii. If not, test if it is a delete-stroke.
  c. If closed-shape:
    i. Test if it is a circle.
    ii. If not, test if the shape is a rectangle.
  d. If input is a single point:
    i. Test to see if it lies within a text box on the display.
    ii. If it does lie within a text box—open an edit box to modify contents of the text.

Decision step 750 examines whether the input was recognized at step 740. If the recognition tests failed, then the message "Shape not recognized" is returned at 760 and may be displayed to the user. If the input gesture can be recognized, then the proper status is returned at 770 so that the corresponding graphic primitive can be generated and displayed on the user interface.

It should be understood that a recognition algorithm can be expanded in different ways. For example, when an input shape is drawn, apart from the sampling of points and the various counters maintained, the program can also record four points denoting the maximum and minimum X and Y movement of the user input. These four points (X_min, Y_min, X_max, Y_max) each contain (x,y) values and are used in later calculations. The input gestures can be given as follows:

I. "L-shape or Axes Stroke:
Pattern: This shape comprises mainly of a series of H segments (H component) and a series of V segments (V component). The pattern is denoted by (V+H). The order in which these components are drawn is not important.
Algorithm:
1. Check if there is exactly 1 V component and 1H component.
2. I segments can be an allowable percentage (e.g., 10%) of the total number of V segments and H segments.
3. The test fails if this condition is not met.
Operation: Once recognized, the program draws coordinate axes and a default two-dimensional coordinate system, as it associates the recognized L shape as a command to draw coordinate axes.

II. Three-Sided Bar or Bar Stroke:
Pattern: This shape comprises of two V components and a single H component denoted as (2V+H).
Algorithm:
1. Check if there is exactly 2 V components and 1H component.
2. I segments must be an allowable percentage (10% in our case) of the total number of V segments and H segments.
3. The test fails if this condition is not met.
Operation: If recognized, program understands that the user is requesting a bar chart to be drawn. The program prompts the user with a dialog screen where the user can select from different types of bar chart: simple, stacked or group bar chart.

III. Circle-Like Shape or Circle Stroke:
Pattern: For a circular shape, the center of the circle is calculated as the intersection between the Line (X_min, X_max) and Line (Y_min, Y_max). This center is denoted as (a, b). The radius r is calculated as the average of the segments (Line(X_min, X_max)/2) and (Line (Y_min, Y_max)/2). For a circle, each sample point that was stored is then compared with the equation of a circle:

$$(x-a)n2+(y-b)n2+/-E<=r2 \quad \text{(equation 1)}$$

Here (x,y) denotes the coordinate location of the sample point under consideration, and E is the allowable error margin in the accuracy of drawing the input shape.
Algorithm: Check if each sample point satisfies the circle equation used (see equation 1).
1. Count the total number of sample points that do not satisfy this equation.
2. The error sample points are to be within 10% of the total number of sample points.
3. If not—the shape is not a circle.
Operation: If recognized, the program draws a default pie chart as it associates the recognized circle-like shape with the user requirement for a pie chart to be drawn.

IV. Horizontal Line—Such as, Gesture or Delete Stroke:
Pattern: This consists of a single H component.
Algorithm:
1. Check if there is only one H component and no V component.
2. Test fails if the above condition is not met.
Operation: If recognized in EDIT_GRAPH mode, the program associates this gesture with the need to delete or remove a label and the associated value and chart representation (bar or slice of pie). The graph is then refreshed to exclude the part or parts deleted.

Error margins can also be used to allow approximate shapes as input. Human users are not expected to be entirely accurate. For this purpose, the recognition algorithms can allow for a certain error margin:
1. For shapes such as the bar shape or the L-shape, the error margin can be a percentage of the total number of segments that make the shape.
2. For a shape such as the circular shape, the error margin can be added at two levels. The first level is allowing sample points that lie at a certain percentage more or less, of the total distance r from the center (a,b) of the shape. And the second level is allowing a small percentage of sample points that do not fit this equation to be part of the remaining circular shape, in order to recognize the input as a circle.

Still further as an illustration of the broad scope of the systems and methods disclosed herein, the systems and methods may be implemented on various types of computer architectures, such as for example on a single general purpose computer or workstation, or on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs within a program, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:
1. A method for generating a specific graphic primitive, comprising the steps of:
receiving, using one or more processors, one or more graphic primitives, wherein a pie chart graphic primitive and a bar chart graphic primitive are specific graphic primitives;
receiving first gesture data indicative of a first gesture, wherein the first gesture data generates a corresponding graphic primitive;
in response to receiving the first gesture data, determining whether the received first gesture data corresponds to a graphic primitive by matching the received first gesture data to a specific graphic primitive;

generating the specific graphic primitive, wherein a pie chart graphic primitive is the specific graphic primitive generated if the received first gesture data is a circular gesture, and wherein a bar chart graphic primitive is the specific graphic primitive generated if the received first gesture data is a bar gesture; and displaying the specific graphic primitive.

2. The method of claim 1, wherein the first gesture is provided by a user through a pen-based device.

3. The method of claim 1, wherein the first gesture is provided by a user through use of a pen-based device on an interactive screen of a tablet personal computer (PC) device.

4. The method of claim 1, wherein the first gesture is provided by a user through a mouse or keyboard device.

5. The method of claim 1, wherein the first gesture provided by the user is a rough approximation of a geometric shape, and wherein the generated specific graphic primitive is a formal business presentation quality version of the input rough approximation.

6. The method of claim 1, wherein the generated specific graphic primitive is a business graph.

7. The method of claim 1, further comprising:
receiving second gesture data indicative of a second gesture; and
editing the specific graphic primitive based upon the received second gesture data.

8. The method of claim 7, wherein the received second gesture data provides information to edit a title of an axis of the specific graphic primitive.

9. The method of claim 7, wherein the received second gesture data provides information to edit content of an axis of the specific graphic primitive.

10. The method of claim 9, wherein based upon the received second gesture data, new data is retrieved from a database for use as content of the axis.

11. The method of claim 10, wherein the new data is retrieved over a network from the database.

12. The method of claim 7, wherein the received second gesture data indicates that selectable candidate values are to be displayed, and wherein the selection of a data value is used with the specific graphic primitive.

13. The method of claim 12, wherein a pull-down box provides the selectable candidate values.

14. The method of claim 12, wherein character gesture data indicative of a character is received, wherein the character indicates which selectable candidate values are displayed, and wherein the selectable candidate values are filtered using the character gesture data.

15. The method of claim 1, further comprising:
receiving second gesture data indicative of a second gesture; and
deleting a portion of the specific graphic primitive based upon the received second gesture data.

16. The method of claim 1, further comprising:
receiving second gesture data indicative of a second gesture; and
editing the specific graphic primitive based upon the received second gesture data such that different graph axis values are used when the specific graphic primitive is displayed.

17. The method of claim 1, further comprising:
providing options for different types of graphic primitives based upon the received first gesture data.

18. The method of claim 1, further comprising:
receiving second gesture data indicative of a second gesture; and
associating the received second gesture data with graphic actions to determine how to edit the specific graphic primitive.

19. The method of claim 1, further comprising:
using associations between the received first gesture data and the one or more graphic primitives to determine a specific graphic primitive to display.

20. The method of claim 19, wherein the received first gesture data is associated with a specific graphic primitive when the received first gesture corresponds at least approximately to the specific graphic primitive.

21. The method of claim 1, further comprising:
receiving mode gesture data indicative of a mode gesture; and
entering into a mode based upon the received mode gesture data, wherein the mode comprises an input mode, bar chart mode, a pie chart mode, an edit mode, and a system mode for handling graphics.

22. The method of claim 1, wherein the specific graphic primitive is for use with a software application.

23. The method of claim 22, wherein the software application is a word processing application, a spreadsheet program, presentation program, or an e-mail program.

24. A system for generating a specific graphic primitive, comprising:
one or more processors;
one or more computer-readable storage mediums containing instructions configured to cause the one or more processors to perform operations including:
receiving one or more graphic primitives, wherein a pie chart graphic primitive and a bar chart graphic primitive are specific graphic primitives;
receiving gesture data indicative of a gesture, wherein the gesture data generates a corresponding graphic primitive;
in response to receiving the first gesture data, determining whether the received gesture data corresponds to a graphic primitive by matching the received gesture data to a specific graphic primitive;
generating the specific graphic primitive, wherein a pie chart graphic primitive is the specific graphic primitive generated if the received gesture data is a circular gesture, and wherein a bar chart graphic primitive is the specific primitive generated if the received first gesture data is a bar gesture; and
displaying the specific graphic primitive.

25. A computer-program product, tangibly embodied in a machine-readable storage medium, including instructions operable to cause a data processing apparatus to:
receive one or more graphic primitives, wherein a pie chart graphic primitive and a bar chart graphic primitive are specific graphic primitives;
receive gesture data indicative of a gesture, wherein the gesture data generates a corresponding graphic primitive;
in response to receiving the first gesture data, determine whether the received gesture data corresponds to a graphic primitive by matching the received gesture data to a specific graphic primitive;
generate the specific graphic primitive, wherein a pie chart graphic primitive is the specific graphic primitive generated if the received gesture data is a circular gesture, and wherein a bar chart graphic primitive is the specific primitive generated if the received first gesture data is a bar gesture; and display the specific graphic primitive.

26. The system of claim 24, further comprising:

using associations between the received gesture data and the one or more graphic primitives to determine a specific graphic primitive to display.

27. The system of claim 24, wherein the received gesture data is associated with a specific graphic primitive when the received gesture corresponds at least approximately to the specific graphic primitive.

28. The system of claim 24, further comprising:

receiving mode gesture data indicative of a mode gesture; and entering into a mode based upon the received mode gesture data, wherein the mode comprises an input mode, bar chart mode, a pie chart mode, an edit mode, and a system mode for handling graphics.

29. The computer-program product of claim 25, further comprising:

using associations between the received gesture data and the one or more graphic primitives to determine a specific graphic primitive to display.

30. The computer-program product of claim 25, wherein the received gesture data is associated with a specific graphic primitive when the received gesture corresponds at least approximately to the specific graphic primitive.

31. The computer-program product of claim 25, further comprising:

receiving mode gesture data indicative of a mode gesture; and entering into a mode based upon the received mode gesture data, wherein the mode comprises an input mode, bar chart mode, a pie chart mode, an edit mode, and a system mode for handling graphics.

* * * * *